(12) United States Patent
Nakaso

(10) Patent No.: US 6,782,492 B1
(45) Date of Patent: Aug. 24, 2004

(54) MEMORY ERROR RECOVERY METHOD IN A CLUSTER COMPUTER AND A CLUSTER COMPUTER

(75) Inventor: Hiroko Nakaso, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/433,238

(22) Filed: Nov. 4, 1999

(30) Foreign Application Priority Data

May 11, 1998 (JP) .......................................... 10-330175

(51) Int. Cl.[7] .............................................. G06F 11/00
(52) U.S. Cl. ................................ 714/42; 714/4; 714/5; 714/48
(58) Field of Search .............................. 714/42, 48, 5, 714/4

(56) References Cited

U.S. PATENT DOCUMENTS

| | | | | |
|---|---|---|---|---|
| 5,394,555 A | * | 2/1995 | Hunter et al. ................ | 711/148 |
| 5,568,609 A | * | 10/1996 | Sugiyama et al. | |
| 5,590,301 A | * | 12/1996 | Guenthner et al. | |
| 6,002,851 A | * | 12/1999 | Basavaiah et al. | |
| 6,092,173 A | * | 7/2000 | Sasaki et al. | |
| 6,401,223 B1 | * | 6/2002 | DePenning | |

FOREIGN PATENT DOCUMENTS

| | | |
|---|---|---|
| JP | 56-19593 | 2/1981 |
| JP | 58-38766 | 3/1983 |
| JP | 59-14197 | 1/1984 |
| JP | 60-222944 | 11/1985 |
| JP | 61-29966 | 2/1986 |
| JP | 61-267844 | 11/1986 |
| JP | 63-191240 | 8/1988 |
| JP | 2-141863 | 5/1990 |
| JP | 2-166544 | 6/1990 |
| JP | 3-152638 | 6/1991 |
| JP | 3-184154 | 8/1991 |
| JP | 8-305677 | 11/1996 |
| JP | 9-146849 | 6/1997 |
| JP | 10-63525 | 3/1998 |

OTHER PUBLICATIONS

Japanese Office Action dated Feb. 12, 2002, with partial English translation.
Japanese Office Action dated Feb. 20, 2001, with partial English translation.

* cited by examiner

Primary Examiner—Robert Beausoliel
Assistant Examiner—Michael Maskulinski
(74) Attorney, Agent, or Firm—McGinn & Gibb, PLLC

(57) ABSTRACT

In a cluster computer which connects a plurality of nodes that include memory and processors through an interconnection network, shutting down of a node due to an irrecoverable error that occurs in a common communication area is prevented, and the availability of the cluster computer is increased.

A system control apparatus in each node sends a system error stop notification to the memory access origin when an irrecoverable error occurred during a memory access request generated in one node is sent to the node proper memory located on the same node step (S 17). However, a common communication area error notification is sent to the memory access origin (step S 10 and step S 18), when an irrecoverable error occurs when a memory access request generated in one node is sent to the common communication area of the memory located on another node and when a memory access request generated on one node is sent to the common communication area of the memory of the same node, and the node shut down is prevented.

17 Claims, 19 Drawing Sheets

MEMORY ERROR RECOVERY METHOD IN A CLUSTER COMPUTER AND A CLUSTER COMPUTER

BACKGROUND OF THE INVENTION

1. Field of the Invention

The present invention relates to an error recovery technology in a parallel computer, and in particular to a memory error recovery technology in a cluster computer.

2. Description of the Related Art

One type of parallel computer is a cluster computer, in which a plurality of nodes that include at least one processor and a memory are connected together by a high-speed interconnecting network, such as a crossbar network. One of the advantages of a cluster computer is that the ratio of cost to capacity is superior. For example, while there is added cost for each node, when using a workstation with a high throughput, a ratio of cost to capacity that is almost as great as that of a super-computer can be obtained. In addition, another advantage is that the system is easily expanded in comparison to a parallel computer having central common memory wherein common memory is centrally allocated at one physical location. Furthermore, another advantage is that because each node is independent as one computer under the control of its proper operating system, it is possible to obtain a multi-job processing configuration, for example, executing a different job at different nodes that configure the cluster computer, or executing one job at a plurality of nodes simultaneously as a parallel program. Moreover, Japanese Unexamined Patent Application, First Publication, No. Hei 8-305677, is an example of a citation relating to such a cluster computer.

In addition, there are cluster computers that are distributed common memory parallel computers that allocate local memory to each node, and do not centrally allocate common memory to one physical location. However, because this is one type of common memory computer, the inter-processor communication model follows the common memory model. That is, communication between nodes is realized by the processor of each node directly accessing the common memory by an address command using a conventional memory access operation. Specifically, when a memory access request generated at one node is an access to the memory located at the same node, the memory access request is transferred to the memory of the same node, and the memory access origin is sent the access result. Otherwise, when a memory access request generated at one node is an access to memory located on another node, the memory in the other node is accessed by the memory access request being transferred to the other node through the interconnecting network, the access result being returned to the request origin node through the interconnecting network, and the memory access origin being notified.

The memory within the nodes that configure the cluster computer store important information that cannot be damaged, such as the operating system and other types of application programs that are executed by the node. Thus, memory is used that has an internal ECC (Error Checking and Correction) function that increases reliability. For example, a 1 bit error can be corrected with a Hamming code that adds 7 correction bits to 32 bits.

When a node carries out a memory access of memory with this kind of internal error correction function, a 1 bit error will be automatically corrected, and the memory access ends normally. However, if there is a 2 bit error, the memory access ends abnormally because it is not correctable, and an irrecoverable abnormal stop is returned as the memory access result. Because a hardware fault that results in an irrecoverable error being generated to the main memory forming the computer constitutes a very serious error, in conventional cluster computers, like general use computers, a system shutdown error notification is issued in the node that receives an irrecoverable abnormal stop as a memory access result, all programs being executed at that node are ended, and the system is stopped.

Therefore, when an irrecoverable error is generated in a common communication area that is located in the memory of each node for communication between nodes, the node that accessed this common communication area causes a system shutdown even if the access origin is memory located on another node. Because an original feature of cluster computers is each mode being able to operate independently, when an irrecoverable error is produced in memory not located on the same node, merely by accessing that location, this node will shut down the system, and this situation becomes a factor in severely decreasing the availability of the cluster computer.

Thus, it is an object of the present invention to stop a node that has accessed the common communication area from shutting down the system due to an irrecoverable error produced in the common communication area of memory located on another node, and increase the availability of a cluster computer.

In addition, in the case that a node, such as a kernel of the operating system, continues operating although an irrecoverable error has occurred in the node's privileged memory that stores necessary information, this node will inevitably shut down the system, and when the irrecoverable error occurs in a common communication area located on that node, it immediately shuts down the system, and this situation is a major factor in causing decreased accessibility of the cluster computer.

Thus, a second object of the present invention is to prevent one node from shutting down the system due to an irrecoverable error occurring in the common communication area of the memory located on that same node, and increase the availability of the cluster computer.

SUMMARY OF THE INVENTION

In order to obtain the first object of the present invention, each node in the cluster computer of the present invention sends to the memory access origin a system error stop notification when an irrecoverable error occurs at the time a memory access request in one node is sent to that same node's privileged area, and sends to the memory access origin a common communication area error notification when the irrecoverable error occurs at the time a memory access request is sent from one node to a common communication area of memory located on another node through the interconnection network.

In this manner, in addition to the conventional system error stop notification, indicating that the system will be immediately stopped because a fatal error has occurred, being sent as a notice that an irrecoverable error has occurred during a memory access, a common communication area error notification is defined that indicates that a minor error has occurred not connected with a system stop. In case an irrecoverable error occurs during a memory access request generated in the same node, if the access destination is the same node's privileged area, a system error stop notification indicating that severe error has occurred is generated. However, if the access destination is the common communication area of the memory located on another node, a common communication area error notification indicating that a minor error has occurred is sent rather than the system error stop notification. Thereby, it is possible to prevent the system being shut down by a node that accesses the common communication area of memory located on another node due to irrecoverable error occurring in that common communication area, and it is possible to increase the availability of the cluster computer.

In the case that an irrecoverable error occurred in the memory of another node due to a memory access request sent from a given node, in the end a common communication area error notification is sent to the memory access origin, such as the processor of the node that is the request origin, and the following types of method are used to determine where this common communication area error message is generated.

In one method, when a memory access request generated in one node is an access request to the memory of another node, a system control device in each node that carries out control of transferring the request to another node through the interconnection network will generate a common communication area error notification when an irrecoverable abnormal stop is received by the other node through the interconnection network in response to the memory access request, and thus notify the memory access origin.

In another method, the interconnection network that requested the transfer of an irrecoverable abnormal stop in response to the memory access request generates instead a common communication area error notification, and sends it to the node that was the transfer destination, that is, the node that was the access request origin.

In another method, the notification is generated in the node that actually made the memory access. That is, the memory access request that is sent from another node through the interconnection network is sent to the memory of the one node, and when the system control device that returns the access result to the node that is the access origin through the interconnection network receives an irrecoverable abnormal stop from the memory of the one node at the time a memory access request is made from the other node, it issues a common communication area error notification instead, and returns it to the access origin through the interconnection system.

Another method is generating the notification in a service processor that receives an error report from each node and makes an error log. That is, when the service processor receives irrecoverable memory error report from a node, it determines whether or not the error occurred in the common communication area, and in case that it occurred in the common communication area, sends a common communication area error message to the node that is the access origin.

In addition, in order to achieve the second object described above, each node in the cluster computer of the present invention sends to the memory access origin a common communication area error notification when an irrecoverable error occurs at the time a memory access request generated in one node is sent to the common communication area of the memory of the same node.

In this manner, when an irrecoverable error occurs at the time a memory access request in one node is sent to the common communication area of the memory of the same node, a common communication area error notification indicating a minor error occurred is sent rather than a system error stop notification, and thereby it is possible to prevent that node from shutting down the system due to an irrecoverable error in the common communication area of the memory located therein, and thus it is possible to increase the availability of the cluster computer.

The processing at the time of the common communication area error notification is carried out within a range that does not involve a shutdown because the error is minor. For example, in the case that the common communication are is partitioned and defined over a plurality of buffers and it is possible to degenerate a buffer unit when it is damaged, processing to degenerate the buffers of the common communication area where the error occurred will be carried out. In addition, in the cases that the configuration is such that a buffer unit cannot be degenerated, or even when this is possible but there is not one normal buffer, processing to close the communication between nodes using the relevant common communication area will be carried out. Thereby, communication between nodes that communicate through this common communication area will become impossible, and this itself is not fatal to the operation of the cluster computer. The reason is that because each node of the cluster computer can operate as one computer, each of the nodes of the cluster computer can continue executing as long as the job does not require communication with other nodes, and even when one job is being executed as a parallel program simultaneously by a plurality of nodes, it is possible to execute the parallel program at the remaining plurality of nodes while excluding the node that can no longer communicate. Furthermore, in communication between nodes according to the common memory model through an interconnection network, it is possible to substitute communication between nodes using the message exchange model in a cluster computer that can support communication between nodes by the message exchange model through a global network such as Ethernet.

Because the common communication area is common logically between the nodes, when an irrecoverable error occurs in a given common communication area, not only the node of the access origin but the other nodes as well can know about this fact, and it is necessary to take steps, for example, to degenerate buffer units. In the typical method of informing the other nodes about the error in the common communication area, the access origin node transfers the common communication area error notification to other nodes through the interconnection network or the global network, but other than this, during access memory by other nodes, in case an irrecoverable error has occurred, it is possible to use the following efficient methods.

In one method, in the case that an irrecoverable abnormal stop occurs in the memory of one node while another node is making a memory access request, the node of the access request origin is sent the irrecoverable abnormal stop through the interconnection network, and at the same time, the processor that same node is also notified.

In another method, the interconnection network that requested transferring the irrecoverable abnormal stop in response to the memory access request broadcasts the irrecoverable abnormal stop to all nodes.

In another method, the interconnection network that requested the transfer the irrecoverable abnormal stop in response to the memory access request broadcasts a common communication area error notification instead to all nodes including the node that was the transfer origin.

In yet another method, in case that an irrecoverable abnormal stop occurs in the memory of one node at the time of a memory access request from another node, instead of an irrecoverable abnormal stop, when the node of the access origin is sent the common communication area error notification through the interconnection network, the interconnection network broadcasts the common communication area error notification to all nodes.

In another method, the service processor sends a common communication area error notification to all nodes, including the node of the access origin.

DESCRIPTION OF THE PREFERRED EMBODIMENTS

Next, the preferred embodiments of the present invention will be explained referring to the figures.

First Embodiment

Figure 1:
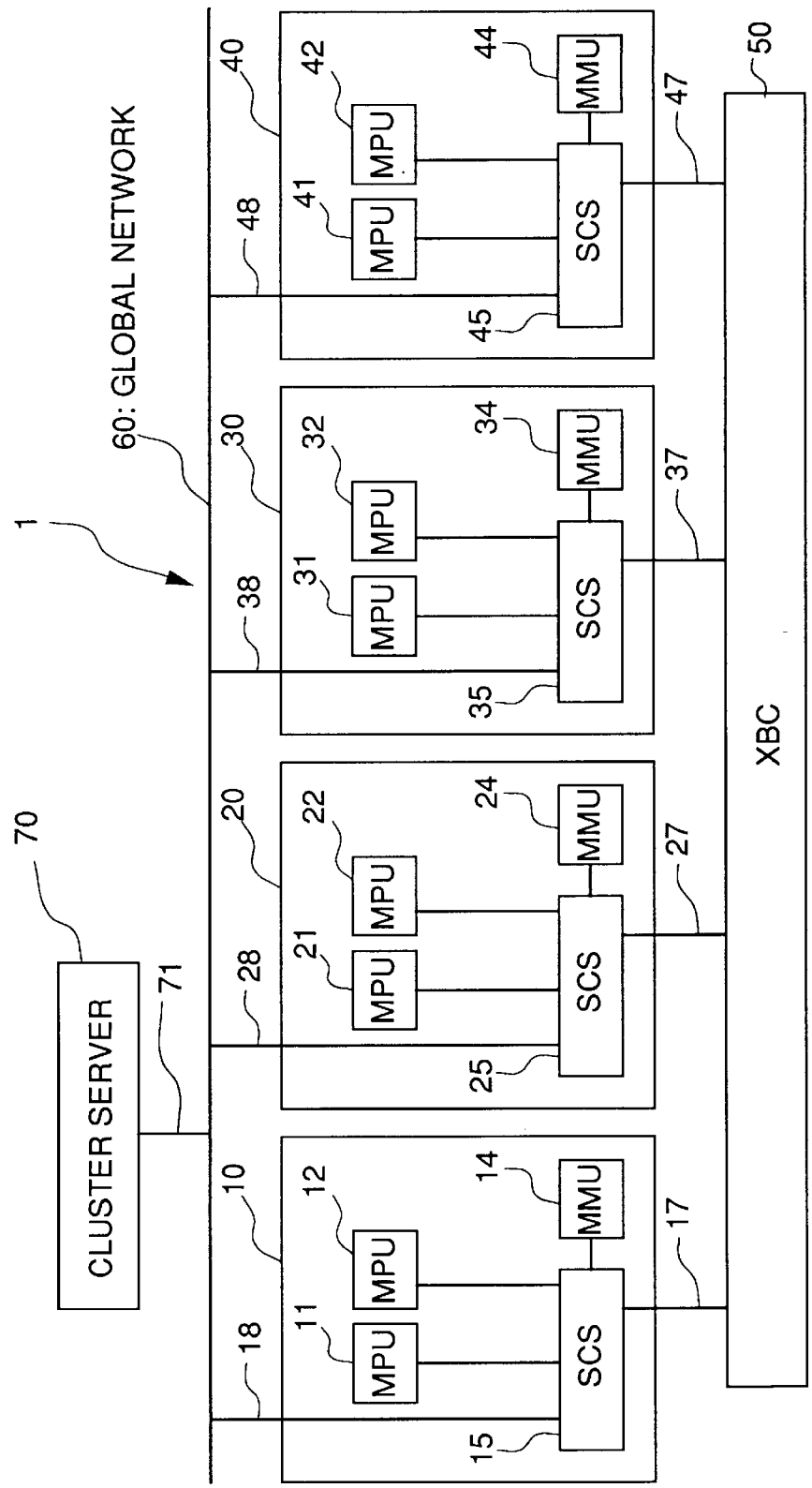
FIG. 1 is a block diagram showing an example of the configuration of a cluster computer according to the first embodiment of the present invention.

Referring to FIG. 1, the cluster computer 1 according to the first embodiment of the present invention is provided with four nodes 10, 20, 30, and 40. The number of nodes in the present example is four, but the present invention can be applied to a cluster computer provided with two or more nodes.

Each of nodes 10, 20, 30, and 40, in the case of the present example, has the same configuration, and is provided with the two micro-processing units (hereinbelow, abbreviated 'MPU') 11, 12, 21, 22, 31, 32, 41, and 42, a system control subsystems (hereinbelow, abbreviated 'SCS') 15, 25, 35, and 45 that carries out system control including input and output and memory access; and each node is installed with an individual and independent operating system. Moreover, the number of MPUs included in each node is arbitrary, and each node needs to include at least one MPU, and in addition, there is no need for the number of MPUs in each node to be identical.

The MMU is memory having an error correction function, and can automatically correct a one bit error using, for example, the above-mentioned Hamming code, and can completely detect a 2 bit error. Moreover, by carrying out an ECC check by rereading what that has been written, the MMU in the present embodiment can detect an irrecoverable error while writing, not just while reading.

Each of the nodes 10, 20, 30, and 40 in the cluster computer 1 are connected to the crossbar controller 50 (hereinbelow, abbreviated 'XBC') through the signal lines 17, 27, 37, and 47 in the SCSs 15, 25, 35, and 45. The XBC is a type of interconnection network, and is characterized in being able to connect arbitrary nodes in one level by turning on and off a cross point switch, having an extremely small signal delay. Each node can carry out communication between nodes using the common memory model by accessing an MMU of another node through the XBC 50. In place of an XBC, it is possible to use a multi-level network such as an omega network or another interconnection network. Moreover, communication between MPUs in each node is carried out through the system bus.

Furthermore, each node 10, 20, 30, and 40 in the cluster computer 1 are connected to the global network 60 through the signal lines 18, 28, 38, and 48. Ethernet, for example, can be used as the global network 60. Of course, other forms of a LAN (Local Area Network) can be used as well. Each node can carry out communication between nodes in the message exchange format through the global network 60. That is, the cluster computer 1 can carry out both high speed communication between nodes by the common memory model through the XBC 50 and communication between nodes by the message exchange model through the global network 60.

In addition, in the global network 60, the cluster server 70 is connected through the signal line 71. The cluster server 70 controls the operation state management, including the load on each node, and job management by appropriately communicating with each node 10, 20, 30 and 40 through the global network 60.

Figure 2:
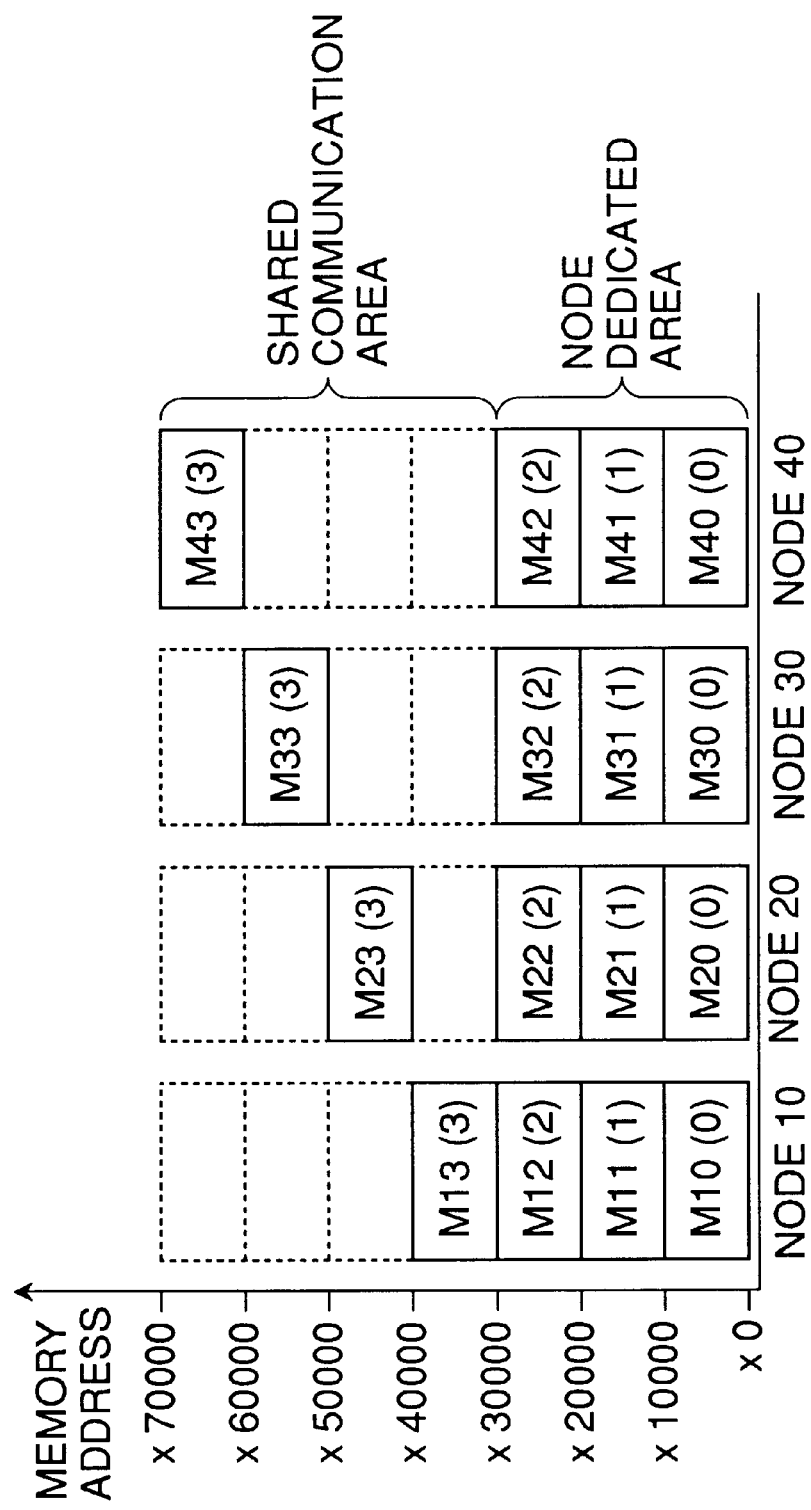
FIG. 2 is a drawing for explaining the memory configuration of the cluster computer.

FIG. 2 is a memory map showing an example of the memory configuration of the cluster computer 1. In FIG. 2, M 10~M 13, M 20~M 23, M 30~M33, and M 40~M 43 denote memory modules physically mounted on the MMUs of each node, and within these, the numerical values 0, 1, 2, and 3 in parentheses are identification numbers for distinguishing the relevant memory module from another memory module within each node. In this example, there are four memory modules installed on each node, but generally, it is sufficient if the number of memory modules is plural, and it is not necessary that the number be the same in all nodes. In addition, the vertical axis in FIG. 2 shows the memory addresses seen from the point of view of the various nodes, and it is assumed that all nodes have a memory space starting from address 0.

In the memory configuration in FIG. 2, the memory addresses from x0 to x2FFFF of each node are mapped on the memory modules M 10~M 12, M 20~M 22, M 30~M 32, and M 40~M 42 located on respective nodes, and use a node privileged area dedicated to the respective nodes. On the other hand, the memory addresses form x30000 to 6FFFF are combined so that the memory modules M 13, M 23, M 33, and M43 of each node have a different structure, and are used as common communication areas mutually accessible by a common address.

Here, in the present embodiment, the independence of the nodes is increased, and in order to prevent error propagation, access to common communication areas of other nodes is restricted to read access only, and write access is prohibited. That is, memory addresses from x30000 to x3FFFF mapped on the memory module M 13 located on node 10 can be both read and write accessed from the MPUs and the IOPs in node 10, but can only be read accessed from the MPUs in the other nodes 20, 30, and 40. Similarly for memory modules M 23, M22, and M 43 located on nodes 20, 30 and 40, and only read access is permitted from other nodes. Therefore, communication by the common memory model between, for example, node 10 and the other nodes 20, 30 and 40 can be realized by node 10 writing data into memory module M 13, and nodes 20, 30, and 40 reading this data.

Moreover, when data is sent through a given area of memory module M 13 from, for example, node 10 to node 20, when node 10 writes data in this area, node 20 is notified to the effect that data has been written in this area through the global network 60 as well as other devices such XBC. On the other hand, when node 20 has finished reading the data in this area, node 10 is notified as such through the global network 60.

In the case that the memory configuration such as that shown in FIG. 2 is used, when memory access is sent from the MPUs of each node, the SCS of that node determines whether it is a local access to a memory module located on the same node or a remote access to a memory module located on another node based on the memory address of the access, and transfers the request in the case of a remote access to the node of the access destination through the XBC 50. Because of this, an SCS in each node corresponds to the memory configuration in FIG. 2, and have a memory management table, such as that shown in FIG. 3, built in.

Figure 3:
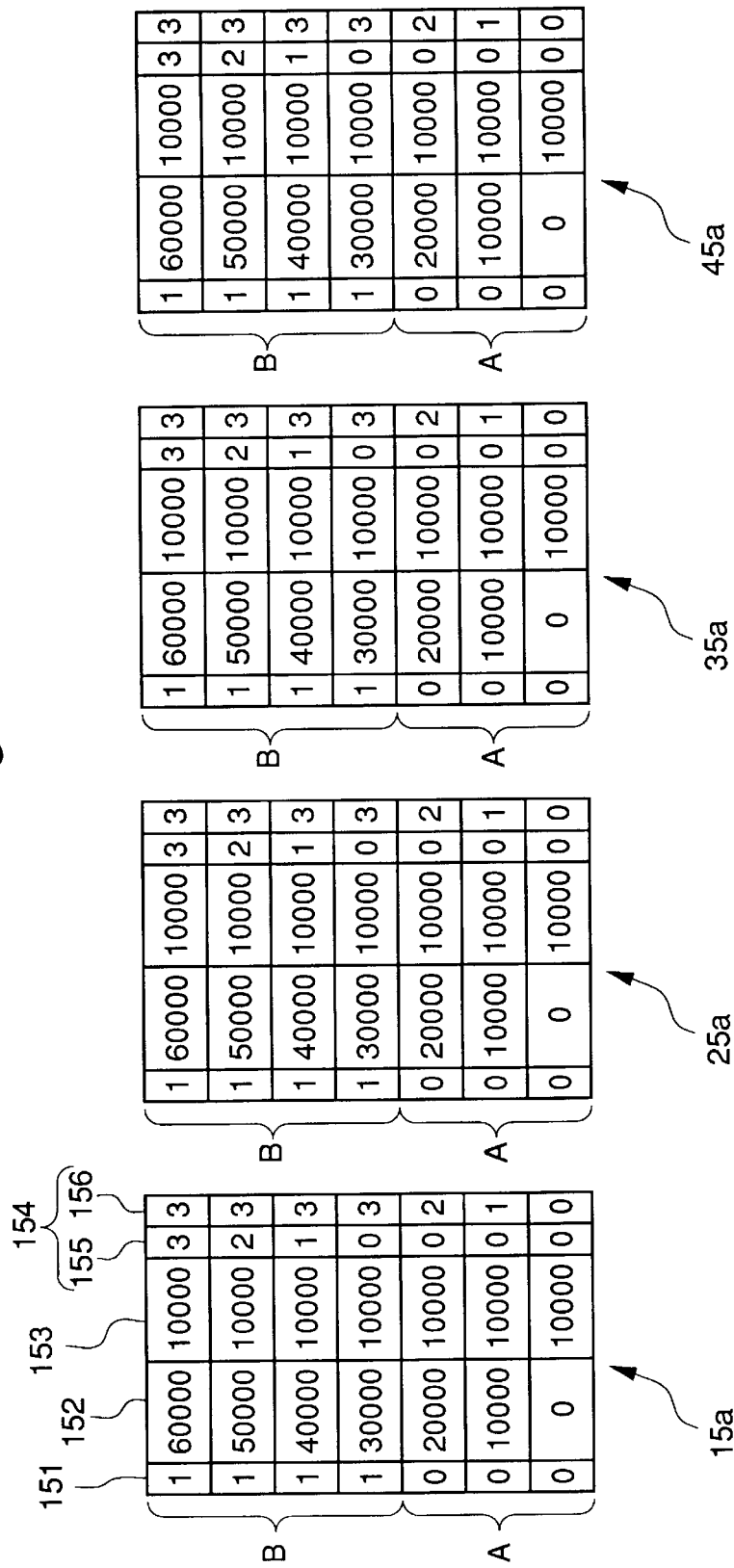
FIG. 3 is a drawing for explaining the memory management table.

FIG. 3 shows memory management tables 15a dedicated to node 10, 25a dedicated to node 20, 35a dedicated to node 30, and 45a dedicated to node 40. Each memory management table is divided into section A, which records partition information of the node privileged area used only by the same node, and section B, which records partition information of the common communication area for communication between nodes. The respective sections A and B are further divided into entries for each memory module.

In addition, for each entry, the initial address 152 and the size (memory length) 153 of the memory address allocated to each memory module, the installation position 154 of the memory module, and the common/privileged bit 151 indicating whether the memory module is a node privileged area or a common communication area, are set. As an installation position 154, for example, the identification number 155 of the node on which the concerned memory module is located and the identification number 156 of the concerned memory module within this node can be used. In addition, the common/privileged bit 151, for example, can take a value 1 if the concerned memory module is common between nodes as a common communication area, and take a value 0 the memory module is used as a node privileged area.

In addition, in the present example, the memory areas of memory modules M 13, M 23, M 33, and M 43, used as a common communication area, are each plurally partitioned, and this makes possible removing a unit of each partitioned area. Each partitioned area is called a buffer, and a table provided in each node for managing the buffers is called a buffer management table.

Figure 4:
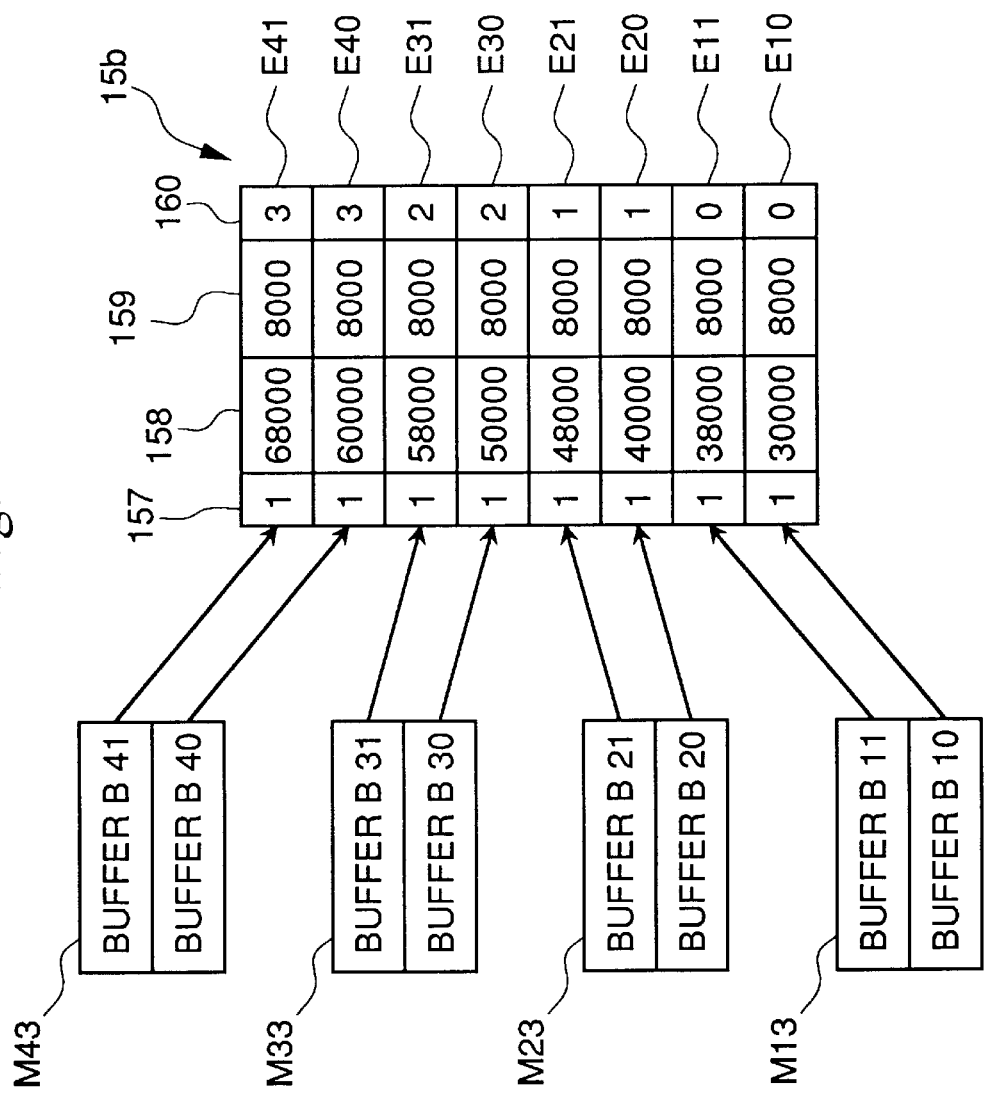
FIG. 4 is a drawing showing an example of the configuration of the buffer in the common communication area and the buffer management table.

FIG. 4 shows an example of the configuration of the buffers and the buffer management table. Here, an example is shown in which each memory area of memory modules M 13, M 23, M33, and M 43 are partitioned into two buffers of the same size, and a total of eight buffers B 10, B 11, B 20, B 21, B 30, B 31, B 40, and B 41 are defined. The buffer management table 15b has entries E 10, E 11, E 20, E 21, E 30, E 31, E 40, and E 41, corresponding one-to-one to each buffer, and in each entry, a validity bit 157 indicating whether or not the concerned buffer can be used, an initial address 158 and a size (buffer length) 159 for the concerned buffer, and an identifier 160 of the node on which the memory module, including the concerned buffer, is located, that are set. The validity bit 157, for example, can be set to 1 if usable, and 0 if not usable. The buffer management table 15b, for example, can be stored in the node privileged area of each node. In addition, a similar buffer management table 15b can be stored in the cluster server 70.

Figure 5:
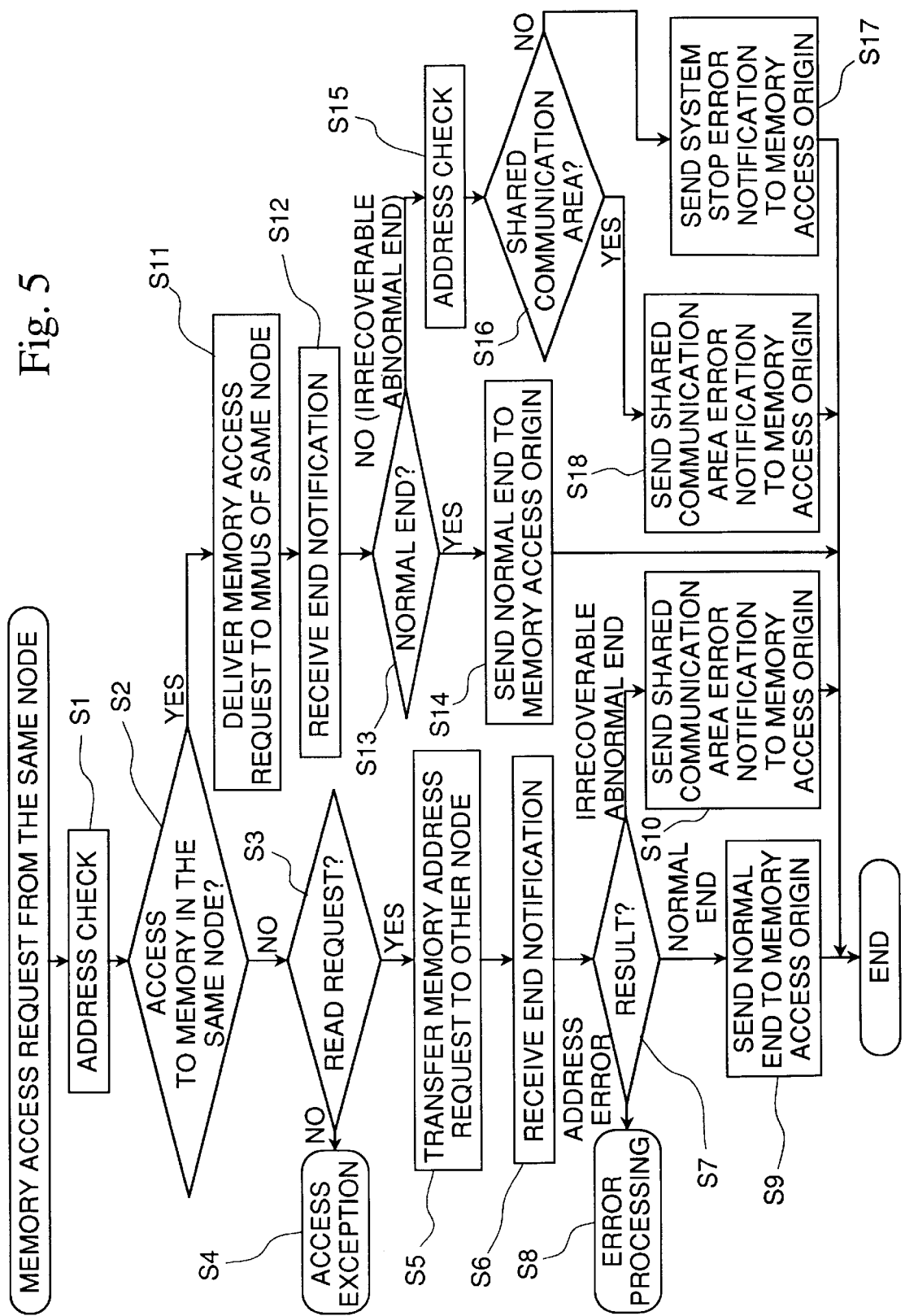
FIG. 5 is a flow chart showing an example of the processing of the SCS when a memory access request is received from the MPU of one node.
Figure 6:
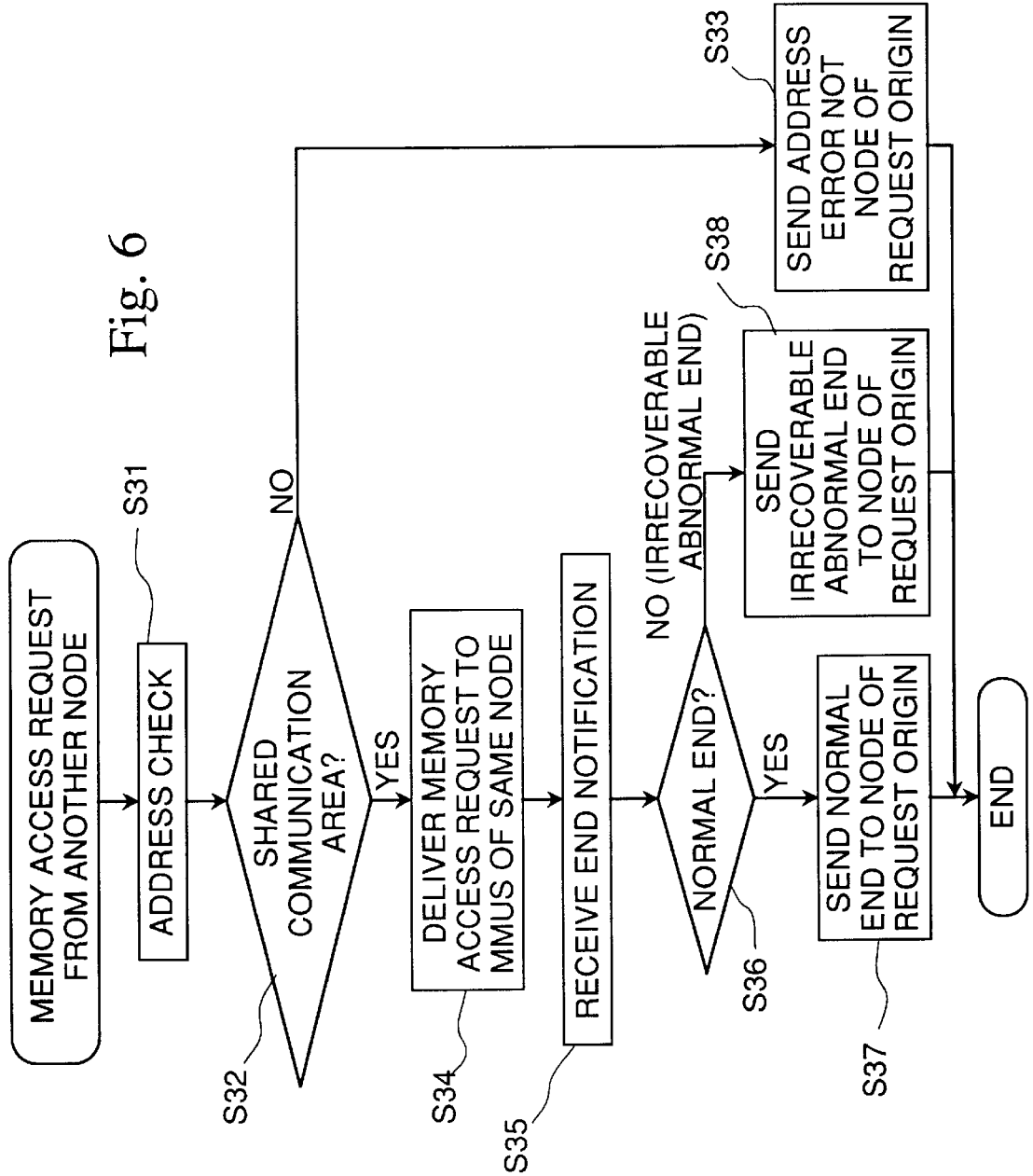
FIG. 6 is a flow chart showing an example of the processing of the SCS when a memory access request is received from another node.
Figure 7:
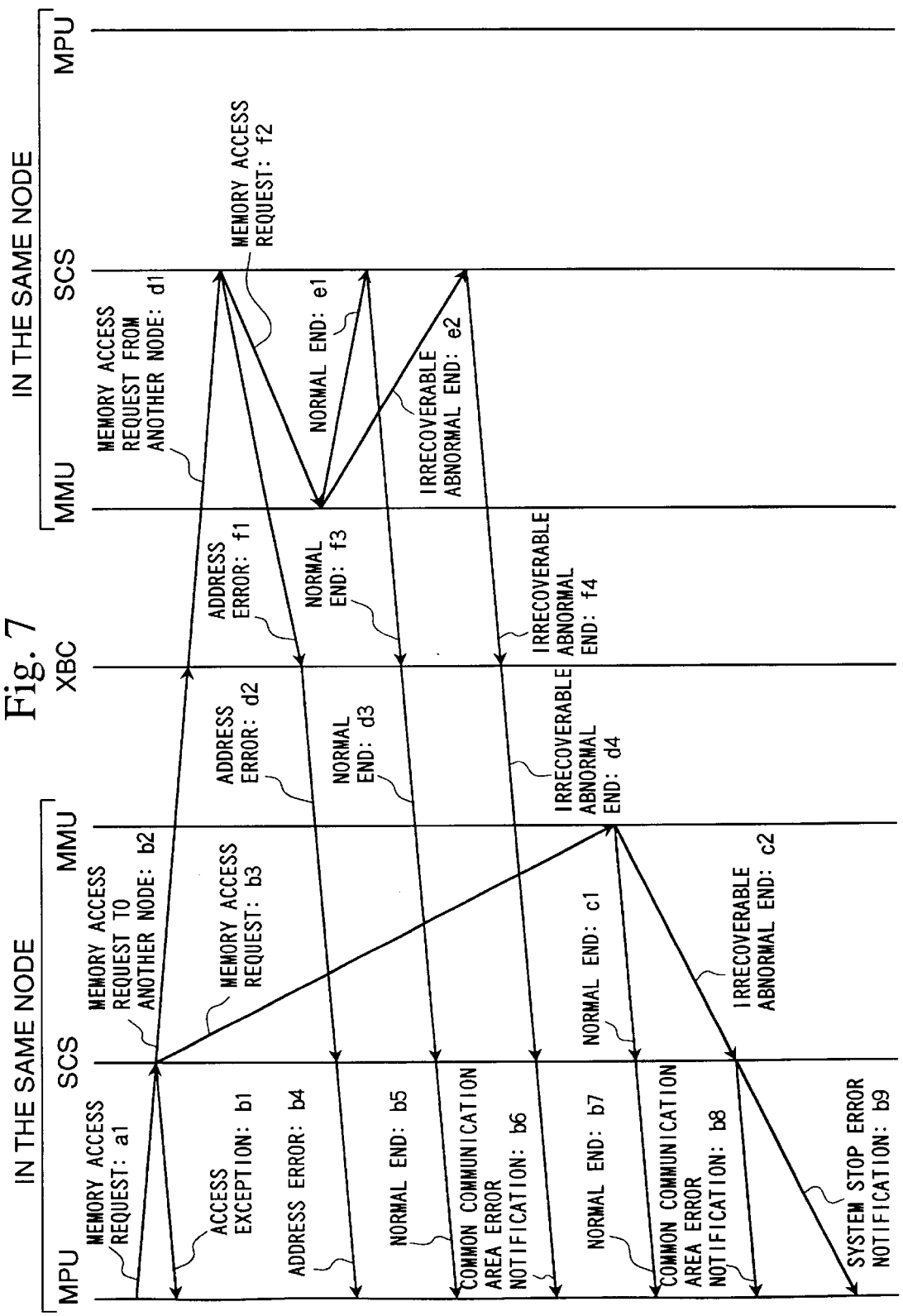
FIG. 7 is a drawing showing the processing flow of memory access in the first embodiment of the present invention.

FIG. 5 and FIG. 6 are flow charts showing an example of the processing related to memory access of SCS in each node, and FIG. 5 shows an example of the processing when a memory access request is received from an MPU in the same node, and FIG. 6 shows an example of the processing when a memory access request is received from another node. In addition, FIG. 7 is a drawing showing the flow of signals related to the memory access when a memory access request issues from an MPU in a given node.

Below, referring to each of the figures, the processing during a memory access in the cluster computer 1 of the present embodiment will be explained. Moreover, because the processing during memory access for each node 10, 20, 30, and 40 is the same, below, a memory access generated within node 10 will be used as an example.

When the MPUs 11 and 12 in the node 10 carry out a memory access, irrespective of whether the access destination memory is memory in the same node or memory in another node, a memory access request is made using an address assignment by a normal read/write command. The MPU 11 and 12 that made the memory access request are called the memory access origin. The memory access request from the memory access origin is passed to the SCS 15 of the same node 10, as shown by a1 of FIG. 7.

The SCS 15 first uses the memory management table shown in FIG. 3 to check whether the memory access a1 is an access to memory in the same node or an access request to memory in another node (step S 1 in FIG. 5). Specifically, the SCS 15 checks the value of the node identification number 155 in entries that include the memory address indicated by memory access request a1 in the range from the initial address 152 to the size 153, and determines that the access request is to memory in the same node if this value is an identification number in the same node 10 (YES in step S 2), and determines that the access request is to memory in another node if the value is this the identification number of any of the other nodes 20, 30, or 40 (NO in step S 2). Below, each case will be explained separately.

(1) The case that the memory access is in another node.

The SCS 15 checks whether or not memory access request a1 is a read request (step S 3), and if it is a write request, sends the memory access origin an access exception (step S 1, b1 in FIG. 7). Otherwise, if it is a read request, the memory access request a1 is transferred to the node of the access destination through the XBC 50 (step S 5, b2, d1 in FIG. 7). Then, the SCS 15 waits for the response from the node of the access destination. Below, for the sake of the convenience of explanation, it is assumed that in order for the memory access origin to read communication data from the node 20, a memory access request using the buffer B 20 in FIG. 3 as the read destination is sent. In this case, the relevant memory access request will be sent to the SCS 25 of node 20 through the XBC 50.

When the SCS25 of node 20 receives a memory access request d1 from the node 10 through the XBC 50, it checks whether or not the memory access request d1 is to the common communication area located on the same node using the memory management table 25a in FIG. 3 (step S 31 in FIG. 6). Specifically, the SCS25 checks the values of the common/privileged bit 151 in the entry including the memory address indicated by memory access request d1 within a range from the initial address 152 and the size 153 and node identification number 155, and if the value of the common/privileged is 1 and the value of the node identification number 155 is the identification number of the same node 20, then it determines that it is an access request for the common communication area located on the same node, and otherwise, it determines that this is not the case. In addition, if the memory access request d1 is not to the common communication area located on the same node (NO in step S 32), node 10 is sent the address error through the XBC 50 (step S 33 in FIG. 7, f1, d2). When the SCS 15 of node 20 receives the address error d2 (step S 6 in FIG. 5), it proceeds to error processing (step S 7, step S 8). Because data corruption in the memory management table and damage to the XBC 50, etc., can be considered as causes that produce this kind of memory error, appropriate processing is carried out in the error processing.

Moreover, since this point is not important for the present invention, detailed explanation thereof is omitted.

Otherwise, if the memory access request d1 is to the common communication area located on the same node (YES in step S 32), the SCS 25 of node 20 passes the this memory address request, that is, the read request, to the MMU 24 (step S 4, FIG. 7, f2). In addition, the SCS 25 waits for a completion notification from the MMU 24.

The MMU 24 responds to this read request, reads data from the area (here assumed to be the area in buffer B 20 of the memory module M 23) of the memory module corresponding to a location on the same node, and checks the ECC. If there is no error, the MMU 24 returns the data to the SCS 25 as a normal end, and even if there is an error, the MMU 24 returns corrected data if the error can be corrected to the SCS 25 (e1 of FIG. 7). If the data read has an irrecoverable error, it returns an irrecoverable abnormal stop to SCS 25 (e2 in FIG. 7). The memory address that generated the error is included in an irrecoverable abnormal stop.

When the SCS 25 receives the normal end e1 from the MMU 24 (step S 35, step S 36), node 10 is sent the abnormal stop through the XBC 50 (step S 37, FIG. 7, f3, d3). At node 10, this normal end is received by SCS 15 (Step S 6, step S 7 in FIG. 5), and the memory access origin is notified (step S 9, FIG. 7, b5).

Otherwise, when the SCS 25 receives an irrecoverable abnormal stop from MMU 24 (step S 35, step S 36), node 10 is sent the abnormal stop through the XBC 50 (step S 38, FIG. 7, f4, d4). At node 10, when the SCS 15 receives this irrecoverable abnormal stop notification (step S6 and step S10 in FIG. 5), it sends a common communication area error notification to the memory access origin (step S 6 and step S 7 in FIG. 5). The error address included in the irrecoverable abnormal end is included in the common communication area error notification.

The above processing of the SCS 15 is the point greatly differing from the conventional method. That is, conventionally, when the memory access request from within the memory access origin in the same node 20 is transferred to another node, in the case that a notification of an irrecoverable abnormal stop is received from the other node, the SCS 15 sends a system stop error notification to the memory access origin. In contrast, in the present embodiment, a common communication area error notification indicating an error less severe than an error when a system stop error is generated is sent to the memory access origin. Thereby, it is possible to separate the memory error processing in the memory access origin.

Below, an example of the processing of the cluster computer 1 in the case that an irrecoverable error occurs in the common communication area will be explained.

In the case the memory access origin that receives a common communication error notification is in the MPU 11 of node 10 or 12, the MPU 11 or 12 begins processing to degenerate the buffer having the damage by activating the buffer degeneracy program after transferring the common communication area error notification and the global network 60 to the cluster server 70 and all nodes 20, 30, and 40. The buffer degenerecy program first searches the buffer management table 15b shown in FIG. 4 stored in the same node 10 with the error address sent in the common communication area error notification, and specifies the damaged buffer. Next, the validity bit 157 of the entry E20 corresponding to the damaged buffer is made 0. Thereby, in the same node 10, when communicating with node 20, buffer B20 is no longer used.

In the nodes 20, 30, and 40 that received the common communication error notification through the global network 60, this notification is transmitted to one of the MPUs through the signal lines 28, 38, and 48, and SCS, and as a result, the buffer degeneracy program activated, the buffer management table 15b in FIG. 4 stored in the same node is updated, and the damaged buffer B 20 is degenerated in the same manner as in node 10. Thereby, in the node 20, the buffer B 20 is no longer used when communicating with nodes 10, 30, and 40; in node 30, buffer B 20 is no longer used with communicating with Node 20; and in node 40, buffer B 20 is no longer used when communicating with Node 20.

In the cluster server 70 that received a common communication area error notification through the global network 60 as well, the state of the buffer is managed by updating in the same manner the buffer management table 15b of FIG. 4 that it stores.

According to the above, when the buffer B 20 is degenerated from each node, transmission according to the common memory model from node 20 to other nodes 10, 30, and 40 is thereafter implemented by using only buffer B 21. Therefore, when communication between nodes carried out using the degenerated buffer 20 does not end normally, a retry of the communication between nodes using the buffer B 21 is carried out.

In addition, not only buffer B 20, but when an irrecoverable error occurs in buffer B 21 and it is degenerated, in the buffer management table 15*b*, the validity bits 157 for all entries E 20 and E 21 that have taken the value 1, indicating the node identifier 160 is node 20, takes the value 0, and all buffers for communicating from the node 20 to the nodes 10, 30, and 40 according to the common memory model are eliminated. When this state comes about, in node 20 communication between nodes 10, 30, and 40 according to the common memory model is closed off, and at nodes 10, 30, and 40, communication with node 20 according to the common memory model is closed off. In addition, the cluster server 70 directs that communication between node 20 and other nodes 10, 30, and 40 can no longer be carried out according to the common memory model. However, in the cluster computer 1 according to the present embodiment, because communication by the message exchange model through the global network 60 is possible, by substituting communication between node 20 and the other nodes 10, 30, and 40 with the message exchange model for communication, it is possible to avoid node 20 being down due to the node state management in the cluster configuration.

(2) The Case of the Memory Access in the Same Node

If the memory access request a1 sent from the memory access origin is an access request to the memory in the same node, the SCS 15 passes this memory access request to the MMU 14 of the same node 10 (step S 11 in FIG. 5, b3 if FIG. 7). In addition, it waits for a response from the MMU 14. The MMU 14 responds to this access request, accesses the area of the corresponding memory module located on the same node, and returns the access result to the SCS 15. In the access result, there are two types of end: a normal end and an irrecoverable abnormal stop (c1 and c2 of FIG. 7). In addition, in the irrecoverable abnormal stop, the damaged memory address that ended abnormally is included.

When the SCS 15 receives a normal completion c1 from the MMU 14 (steps S 12, S13), it notifies the memory access origin of this (step S 14, b7 in FIG. 7). Otherwise, when the SCS 15 receives an irrecoverable abnormal stop from the MMU 14 (steps S 12, S 13, c2 in FIG. 7 ), using the memory management table 15*a* shown in FIG. 3, it checks whether or not the damaged memory address sent by the irrecoverable abnormal stop is an address in the common communication area located on the same node (step S 15 in FIG. 5). Specifically, the SCS15 checks the common/privileged bit 151 in the entry including the damaged memory address within a range from the initial address 152 and the size 153 and node identification number 155, and if the value of the common/privileged bit is 1 and the value of the node identification number 155 is the identification number of the same node 10, then it determines that it is an access request for the common communication area located on the same node, and otherwise, it determines that this is not the case. In addition, if the damaged memory address is an address in the common communication area located on the same node, a common communication area error notification is sent to the memory access origin (step S 18, b8 in FIG. 7), and if it is an address outside the common communication area, that is, an address in the node privileged area, it sends a system stop error notification to the memory access origin (step S 17, b9 in FIG. 7).

The above processing of the SCS15 is the point that greatly differs from conventional technology. That is, conventionally, in the case of sending a request from a memory access origin in one node 10 to the MMU 14 in the same node 10, in the case a notification of irrecoverable abnormal stop is received, the SCS 15 sends to the memory access origin a system stop error notification. However, in the present embodiment, in the case the error location is the common communication area, a common communication area error notification is generated and sent to the memory access origin. This notification indicates an error has occurred that is more minor than an error in the case of a system stop error occurring. Thereby, the memory access origin can degenerate the memory error processing.

The operation of the memory access origin that has received a common communication area error notification is the same as the above-described (1), and when the memory access origin is MPU 11 or 12, the common communication area error notification is transferred to the cluster server 70 and all the nodes 20, 30, and 40 through the SCS 15, the signal line 18, and the global network 60, and then by activating the buffer degeneracy program, the processing for removing the buffer with the error is started.

In the buffer degeneracy program, the buffer management table 15*b* in FIG. 4 that node 10 holds is searched by the error address indicated by the common communication area error notification, and the buffer with the error is specified. In addition, when, for example, buffer B10 is specified as the buffer with the error, the validity bit 157 of the entry E 10 corresponding to buffer B 10 with the error is set to a value 0. Thereby, subsequently, in the one node 10, buffer B 10 is not used when communicating with the other nodes 20, 30, and 40.

In the nodes 20, 30, and 40 that received the common communication area error notification through the global network 60, this notification is transmitted to one of the MPUs through the signal line 28, 38, and 48 and SCS, so that a buffer degeneracy program is activated, and the buffer maintenance table 15*b* in FIG. 4 that holds the one node is updated, and the buffer B10 with the error is degenerated in the same manner as that of node 10. In addition, at the cluster server 70 to which the common communication area error notification is transferred through the global network 60 as well, the buffer management table 15*b* in FIG. 4 it holds is updated in the same manner, and thereby the state of the buffer is managed.

In the above-described manner, when the buffer B 10 is degenerated at each node, the transmission according to the common memory model from node 10 to other nodes 20, 30, and 40 is subsequently implemented using only buffer B 11.

In addition, when not only buffer B 10, but buffer B 11 is also degenerated because an irrecoverable error has occurred, in the buffer management table 15*b*, the validity bit 157 of all entries E 10 and E 11 that are 0, in which the identifier 160 becomes 0, indicating node 10, and the buffers for sending from node 10 to nodes 20, 30, and 40 according to the common memory model are all eliminated. In this state, transmission between node 10 and the other nodes 20, 30, and 40 according to the common memory model is closed, and transmission between nodes 20, 30, and 40 and node 10 according to the common memory model is closed. In addition, cluster server 10 carries out management in such a manner that communication according to the common memory model cannot be carried out between node 10 and the other nodes 20, 30, and 40. However, in the cluster computer 1 of the present embodiment, because communication is possible according to the message exchange model through the global network 60, it is possible to avoid node 10 going down in terms of node state management in the cluster configuration by switching to communication according to the message exchange model between node 10 and the other nodes 20, 30, and 40.

On the other hand, when a system stop error notification has been received, the relevant node 10 ends all programs under execution at that node, and stops the system. That is, the node goes down. The cluster server 70 carries sends at a specified cycle a heart beat signal to each node through the global network 60, and if no response returns from node 10 in response to the hertz check, it detects that node 10 has shut down the system. Thus in terms of node state management in the cluster configuration, node 10 is managed as being in a down state. In addition, the other nodes 20, 30 and 40 are notified that node 10 is down through the global network 60, and any communication between each of nodes 20, 30, and 40 with node 10 is stopped.

In the first embodiment of the present invention explained above, the following effects are obtained:

(a) In each node, when an irrecoverable error occurs while a common communication area located on another node is accessed, as a response, it is possible to return to the memory access origin a common communication area error indicating that an error more minor than a system stop error notification has occurred. Thereby, it is possible to avoid a state in which other nodes shut down the system because of an error in the common communication area in the memory module located on a given node.

(b) In each node, when an irrecoverable error occurs while common the communication area located on the same node is accessed according to a memory access request generated in the same node, as an answer it is possible to return to the memory access origin a common communication area error indicating that an error more minor that a system stop error notification has occurred. Thereby, it is possible to avoid a state in which one node shuts down the system because of an error in the common communication area in the memory module located on the same mode.

(c) Because the common communication area is partitioned into a plurality of buffers and it is possible to degenerate buffer units, no matter which buffer an irrecoverable error occurs in, it is possible to continue communication between nodes according to the common memory model by using sound buffers.

(d) Because communication between nodes according to the message exchange model through the global network 60 is supported in addition to communication between nodes according to the common memory model through the XBC 50, even when all buffers used in communication with other nodes have been degenerated, communication between nodes can be ensured by communication between nodes according to the message exchange model.

Second Embodiment

The second embodiment of the present invention differs from the first embodiment in that in the case there is a memory access request to the common communication area located on the same node from another node, when an irrecoverable error has occurred, the SCS of the one node returns an irrecoverable abnormal stop to the other node of the request origin, and at the same time, sends a common communication area error notification to the MPU of the same node. Otherwise, this embodiment is identical to the first embodiment.

Figure 8:
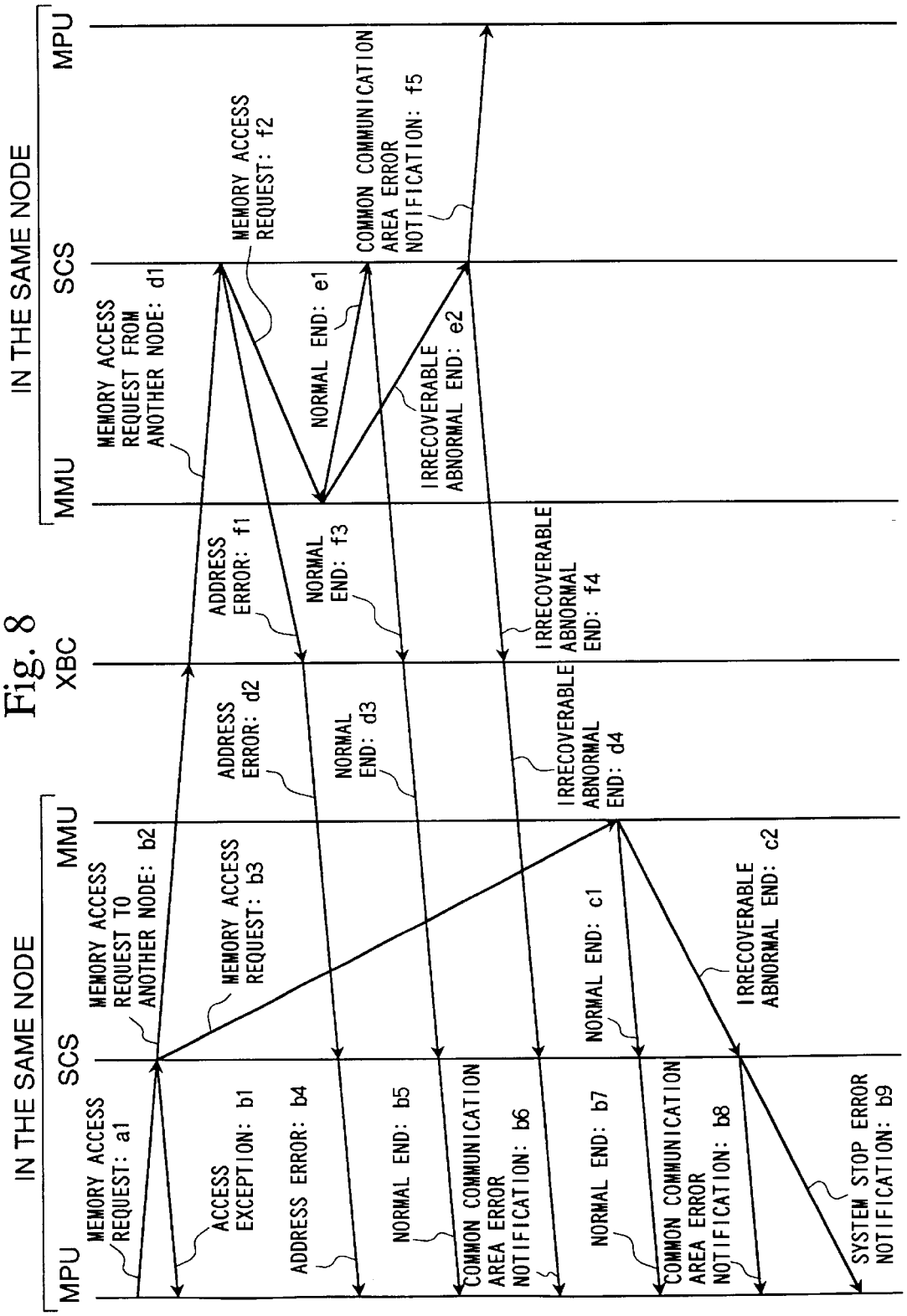
FIG. 8 is a drawing showing the processing flow of a memory access according to the second embodiment of the present invention.

In this embodiment of the present invention, the processing of step S 38 in FIG. 6 in the SCS of each node is updated so that notification of an abnormal stop indicating irrecoverable error in the node of the request origin is sent through the XBC 50, and at the same time the common communication area error notification f5 is sent to the MPU of the same node, as shown in FIG. 8. Thereby, the buffer degeneracy processing in the same node can start before the common communication area error notification is delivered from the node by the access request origin through the global network 60. Moreover, subsequently the common communication area error notification delivered through the global network 60 for the same node is ignored.

Third Embodiment

The third embodiment of the present invention differs from the first embodiment in that when the transfer of an irrecoverable abnormal stop is requested as a response to a memory access from any node, the XBC 50 broadcasts the irrecoverable abnormal stop to all nodes, not just the nodes that were addressed, and the SCSs of the nodes that received this irrecoverable abnormal stop send a common communication area error notification to the MPUs of the same node. Otherwise, this embodiment is identical to the first embodiment.

Figure 9:
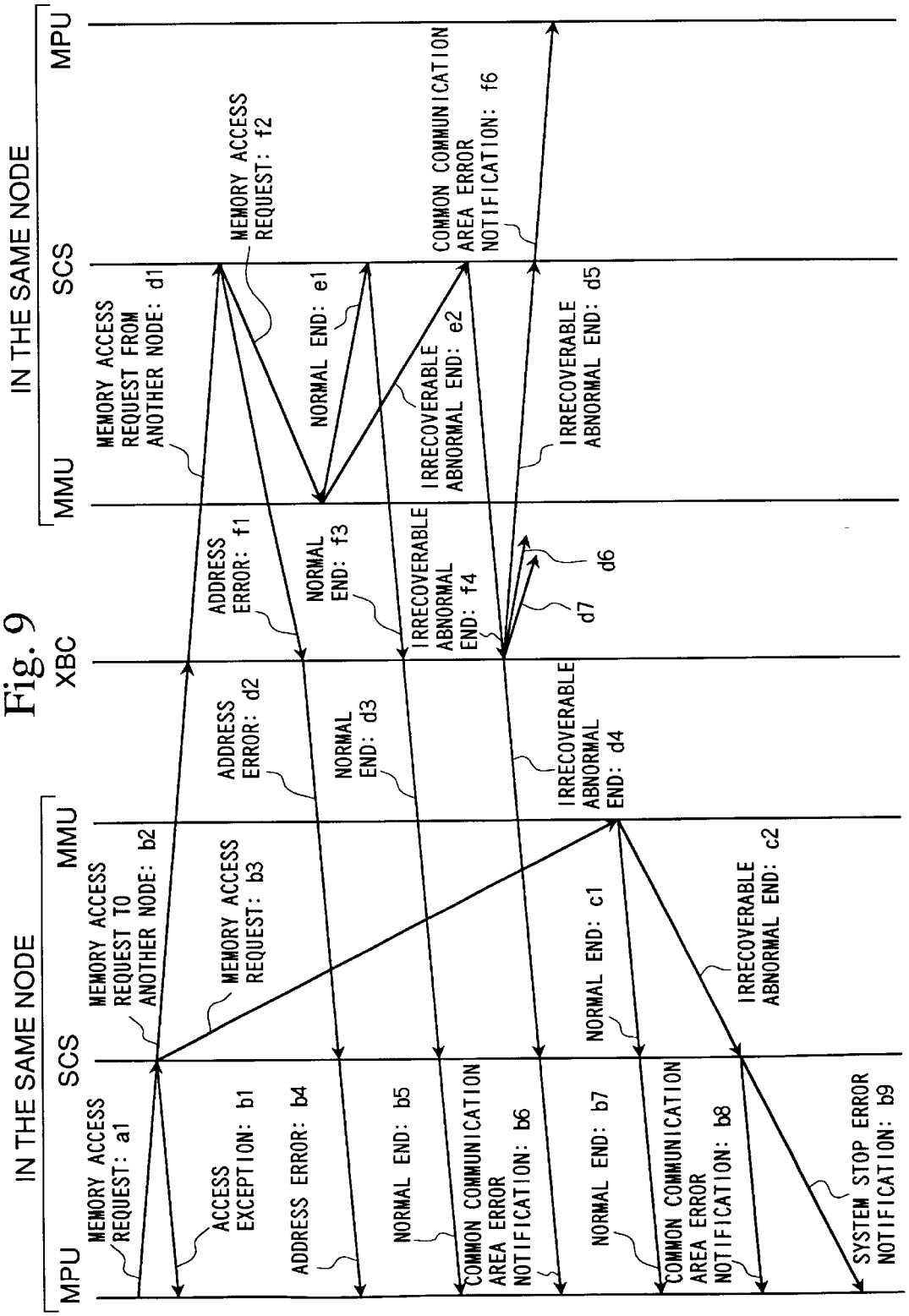
FIG. 9 is a drawing showing the processing flow of a memory access according to the third embodiment of the present invention.

In this embodiment of the present invention, as shown in FIG. 9, when an irrecoverable abnormal stop f4 from the SCS of a given node is sent to the XBC as a response to the memory access from another node, the XBC broadcasts this irrecoverable abnormal stop to all nodes (d4–d7). In the access request origin, a common communication area error notification is sent to the memory access origin of the same node by step S 10 in FIG. 5, and subsequently, the processing explained in the first embodiment is carried out. On the other hand, in the SCS of nodes other than the access request origin, when the irrecoverable abnormal stop is received in a broadcast, the common communication area error notification is sent to the MPUs of the same node (f6 in FIG. 9). Thereby, it is possible to begin the buffer degeneracy processing in the same node before the common communication area error notification is delivered through the global network from the node of the access request origin. Moreover, subsequently common communication area error notification delivered through the global network 60 is ignored for the same node. Of course, it is possible for the node of the access request origin not to send the common communication area error notification only to the cluster server 70, and not to the other nodes through the global network 60.

Fourth Embodiment

The fourth embodiment differs from the first embodiment in that when the transfer of an irrecoverable abnormal stop is requested as the response to a memory access from any node, the XBC 50 converts an irrecoverable abnormal stop into a common communication area error notification and transfers it, and the SCS in the node of the access request origin sends the memory access origin the received common communication area error notification. Otherwise, this embodiment is identical to the first embodiment.

Figure 10:
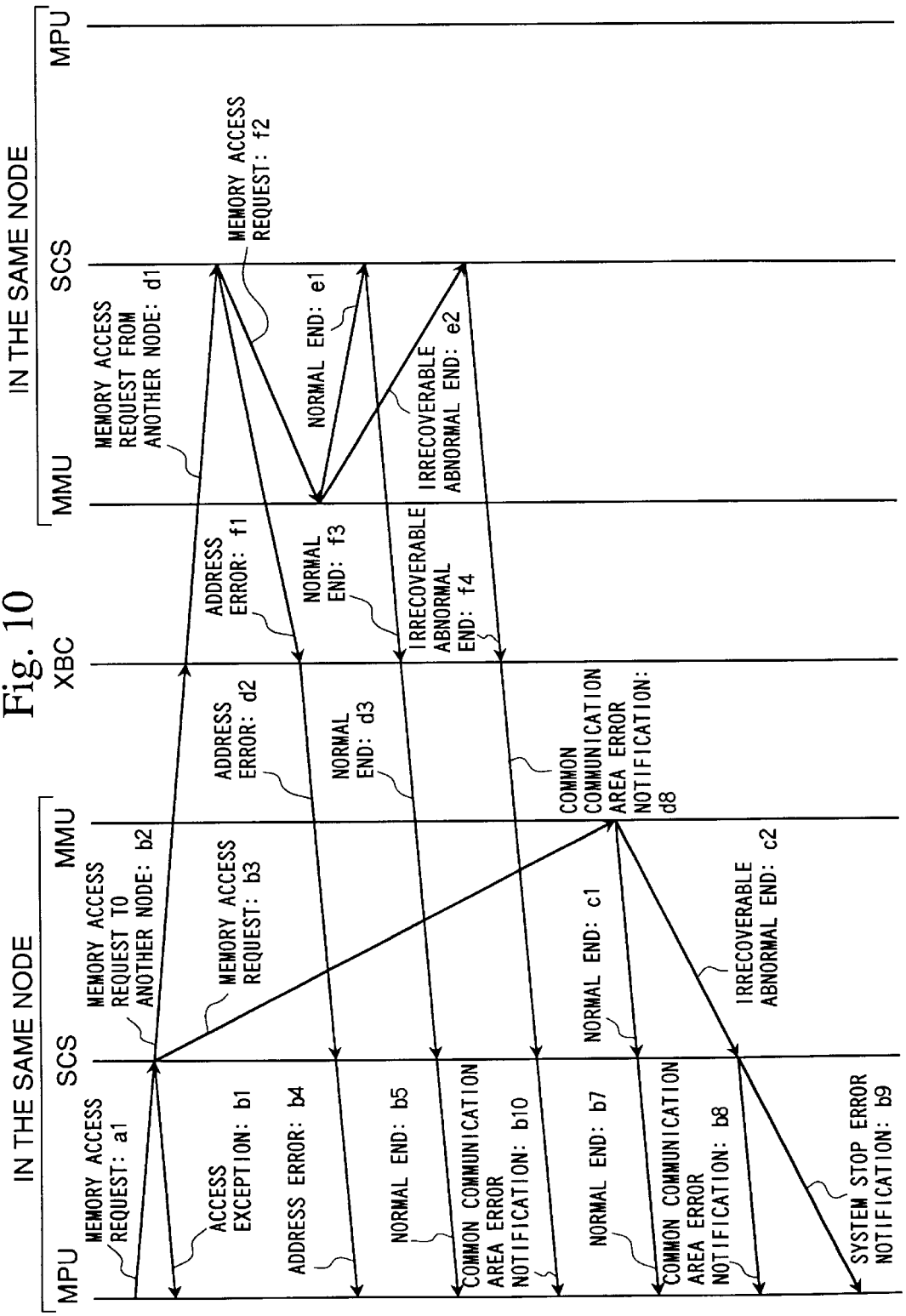
FIG. 10 is a drawing showing the processing flow of a memory access according to the fourth embodiment of the present invention.

In this embodiment, as shown in FIG. 10, when an irrecoverable abnormal stop from the SCS of a given node is sent to the XBC as an response to a memory access from another node, the XBC converts this irrecoverable abnormal stop to a common communication area error notification d8, and transfers it to the node of the access request origin. At the access request origin, in step S7 in FIG. 5, whether the result of the end notification is an address error, a normal end, or a common communication area error notification is determined, and if it is a common communication area error notification, it is sent to the memory access origin in step S 10. Thereby, except when an address error is returned, the processing in the SCS in the access request origin node can be simplified to the normal processing of just sending the memory access origin the received contents.

Fifth Embodiment

The fifth embodiment of the present invention differs from the first embodiment in that when the transfer of an irrecoverable abnormal stop is requested as the response to a memory access from any node, the XBC 50 converts it to a common communication area error notification, and broadcasts the common communication area error notification to all nodes, not just the addressed nodes. The SCS in the node of the access request origin sends the memory access origin the common communication area error notification, and otherwise, in the broadcast, the SCS of the node that received the common communication area error notification sends this common communication area error notification to the MPU of the same node. Otherwise, this embodiment is identical to the first embodiment.

Figure 11:
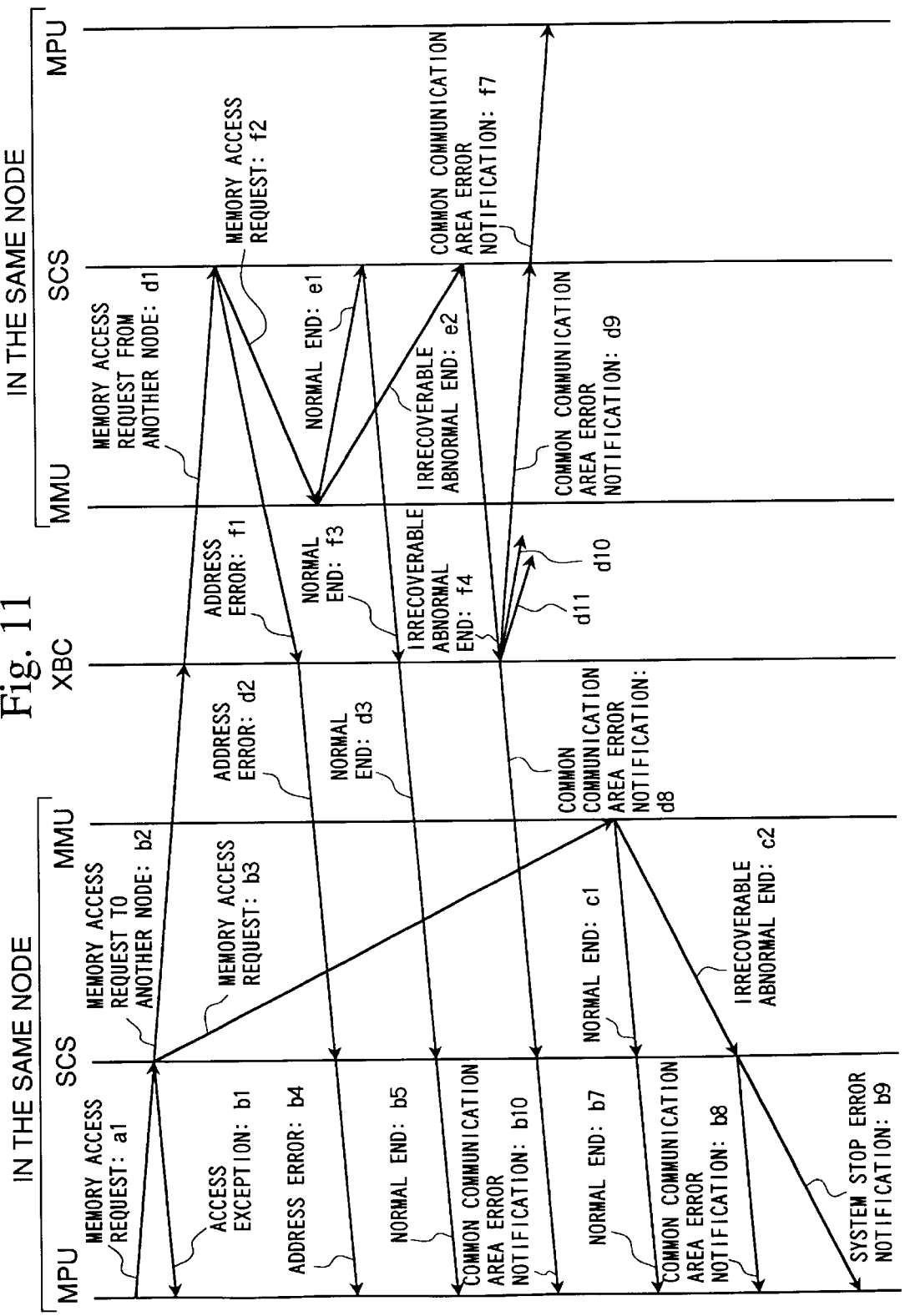
FIG. 11 is a drawing showing the processing flow of a memory access according to the fifth embodiment of the present invention.

In this embodiment, as shown in FIG. 11, when the irrecoverable abnormal stop f4 from the SCS of a given node is sent to the XBC as a response to a memory access from another node, the XBC converts the irrecoverable abnormal stop to a common communication area error notification, and broadcasts this to all nodes (d8~d11). In the node of the access request origin, in step 7 of FIG. 5, whether the result of the end notification is an address error, a normal end, or a common communication area error notification is determined, and if it is a common communication area error notification, it is sent to the memory access origin in step S 10. Thereby, except when an address error is returned, the processing in the SCS in the access request origin node can be simplified to normal processing of just sending the memory access origin the received contents. In addition, the SCS of the other node that receives the common communication area error notification in the broadcast sends it to MPUs in the same node (f7 of FIG. 11). Thereby, it is possible to start the buffer degeneracy processing in the same node before the common communication area error notification is delivered through the global network 60 from the node of the access request origin. Moreover, subsequently, the common communication area error notification delivered through the global network 60 for the same node is ignored. Of course, it is possible for the node of the access request origin not to send the common communication area error notification only to the cluster server 70, and not to the other nodes through the global network 60.

Sixth Embodiment

Figure 12:
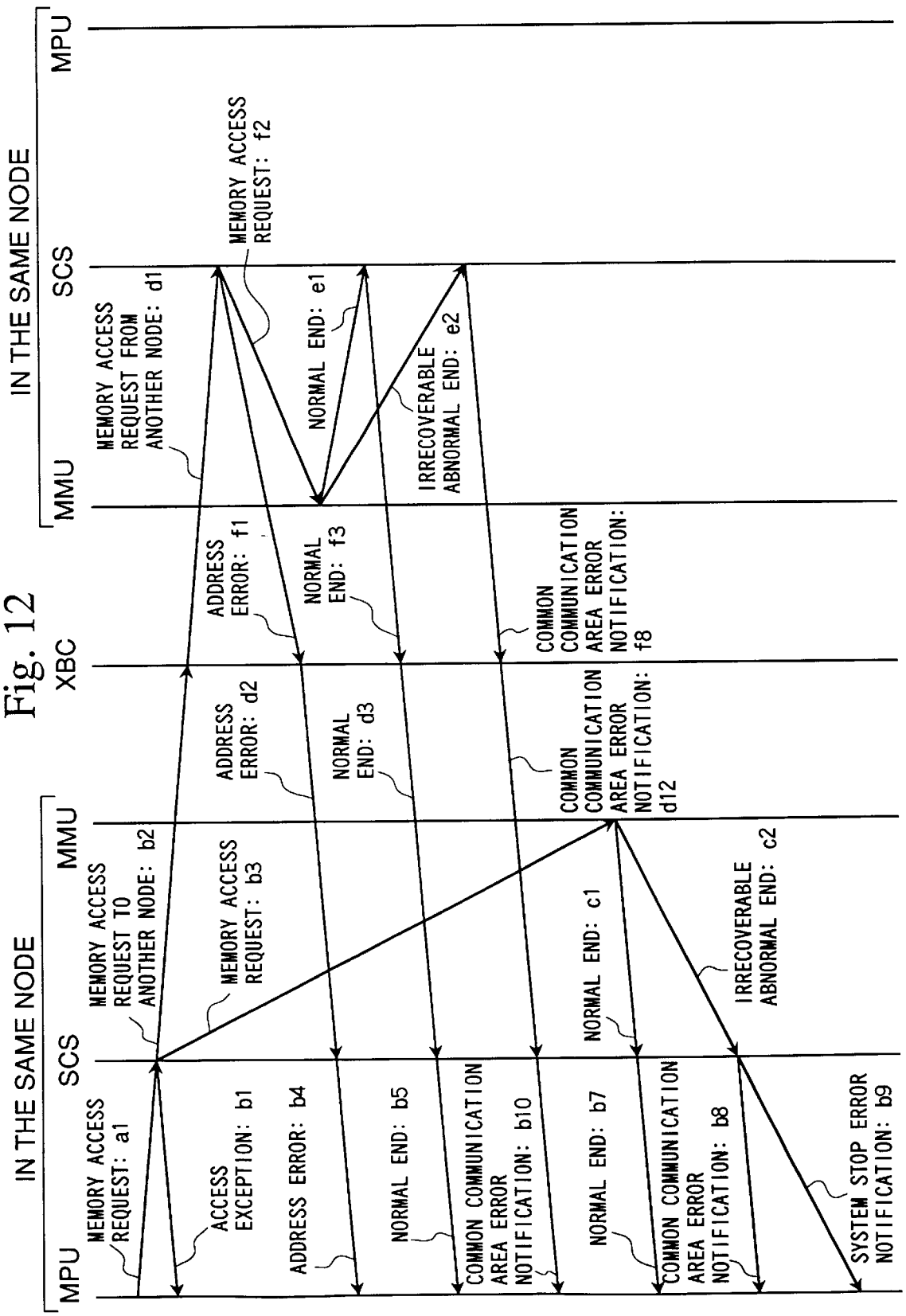
FIG. 12 is a drawing showing the processing flow of a memory access according to the sixth embodiment of the present invention.

The sixth embodiment of the present invention differs from the first embodiment in that when an irrecoverable error occurs in the case that there is a memory access request for common communication area located on the same node from another node, as shown in FIG. 12, the SCS of the same node sends through the XBC a common communication area error notification to the node of the request origin as a response to this memory access (f8, d12). Otherwise, this embodiment is identical to the first embodiment.

In this embodiment, the processing of step S 38 in FIG. 6 in the SCS of each node is updated by processing wherein the node of the request origin is sent a common communication area error notification through the XBC 50. In addition, at the access request origin, in step S7 in FIG. 5, whether the result of the end notification is an address error, a normal end, or a common communication area error notification is determined, and if it is a common communication area error notification, it is sent to the memory access origin in step S 10.

Seventh Embodiment

Figure 13:
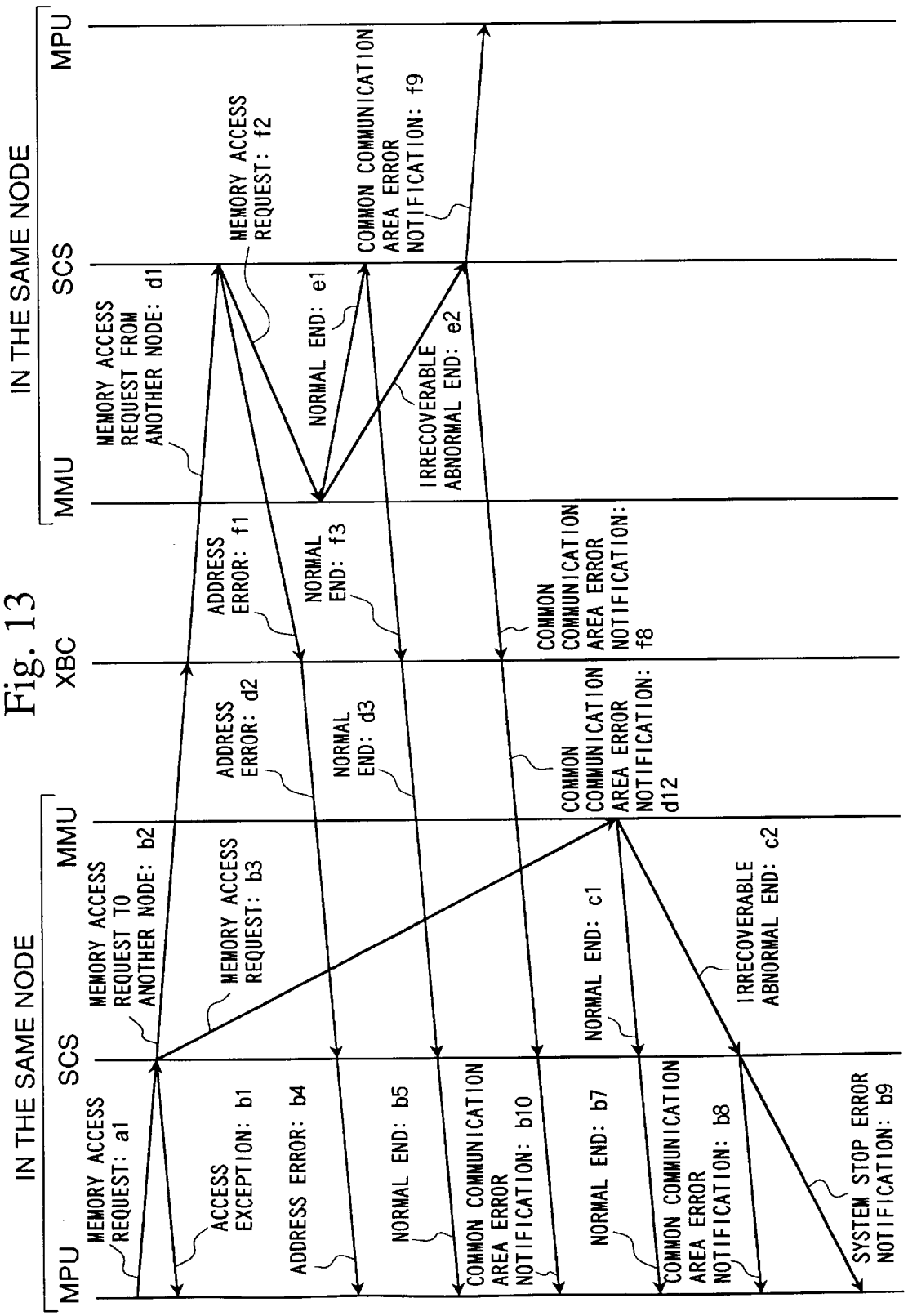
FIG. 13 is a drawing showing the processing flow of a memory access according to the seventh embodiment of the present invention.

The seventh embodiment of the present invention differs from the first embodiment in that when a irrecoverable error occurs in the case that there is a memory access to a common communication area located on the same node from another node, as shown in FIG. 13, the SCS of the same node sends to the node of the request origin through the XBC a common communication area error notification as a response to this memory access, and at the same time, sends this common communication area error notification to the MPUs in the same node (f8, d12, f9). Otherwise, this embodiment is identical to the first embodiment.

In this embodiment, the SCS of each node, in step S 38 of FIG. 6, sends the node of the request origin through the XBC 50 the common communication area error notification, and sends this common communication area error notification to the MPUs of the same node. In addition, in step S 7 of FIG. 5, in the access request origin whether the result of the end notification is an address error, a normal end, or a common communication area error notification is determined, and if it is a common communication area error notification, it is sent to the memory access origin in step S 10. Thereby, before the common communication area error notification is delivered through the global network 60 from the node of the access request origin, it is possible to start buffer degeneracy processing in the same node. Moreover, subsequently, the common communication area error notification delivered through the global network 60 for the same node is ignored.

Eighth Embodiment

Figure 14:
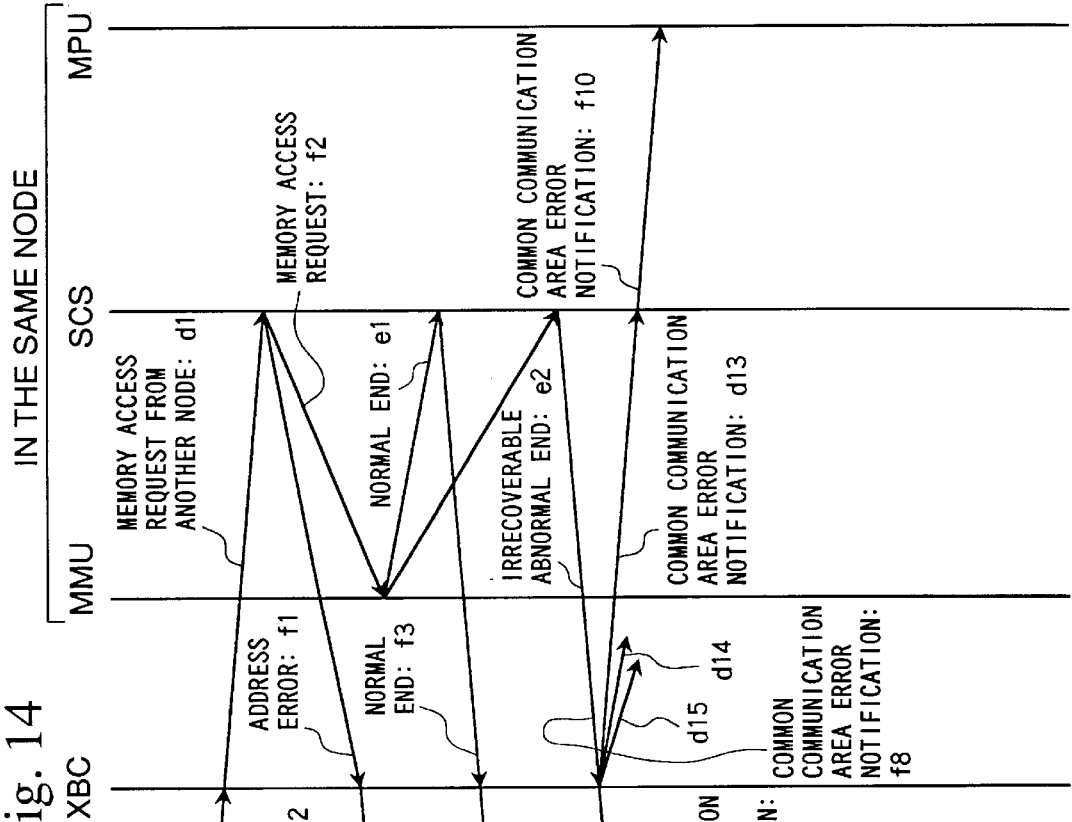
FIG. 14 is a drawing showing the processing flow of a memory access according to the eighth embodiment of the present invention.

The eighth embodiment differs from the first embodiment in that when an irrecoverable error occurs in the case that there is a memory access to a common communication area located on the same node from another node, as shown in FIG. 14, the SCS of the same node sends a common communication area error notification f8 as a response to this memory access, and the XBC broadcasts this common communication area error notification to all nodes, including the node of the access request origin (d12~d15). Otherwise, this embodiment is identical to the first embodiment.

In the present embodiment, the SCS of each node, in step 38 of FIG. 6, requests the transfer of a common communication area error notification to the XBC 50. In addition, at the access request origin, in step S7 of FIG. 5, whether the result of the end notification is an address error, a normal end, or a common communication area error notification is determined, and if it is a common communication area error notification, it is sent to the memory access origin in step S 10. Furthermore, the SCS of the nodes that received the common communication area error notification in the broadcast send it to any MPUs in the same node. Thereby, it is possible to start the buffer degeneracy processing in the same node before the common communication area error notification is delivered through the global network 60 from the node of the access request origin. Moreover, subsequently the common communication area error notification delivered through the global network 60 for the same node is ignored. Of course, it is possible for the node of the access request origin not to send the common communication area error notification only to the cluster server 70, and not to the other nodes through the global network 60.

Ninth embodiment

Figure 15:
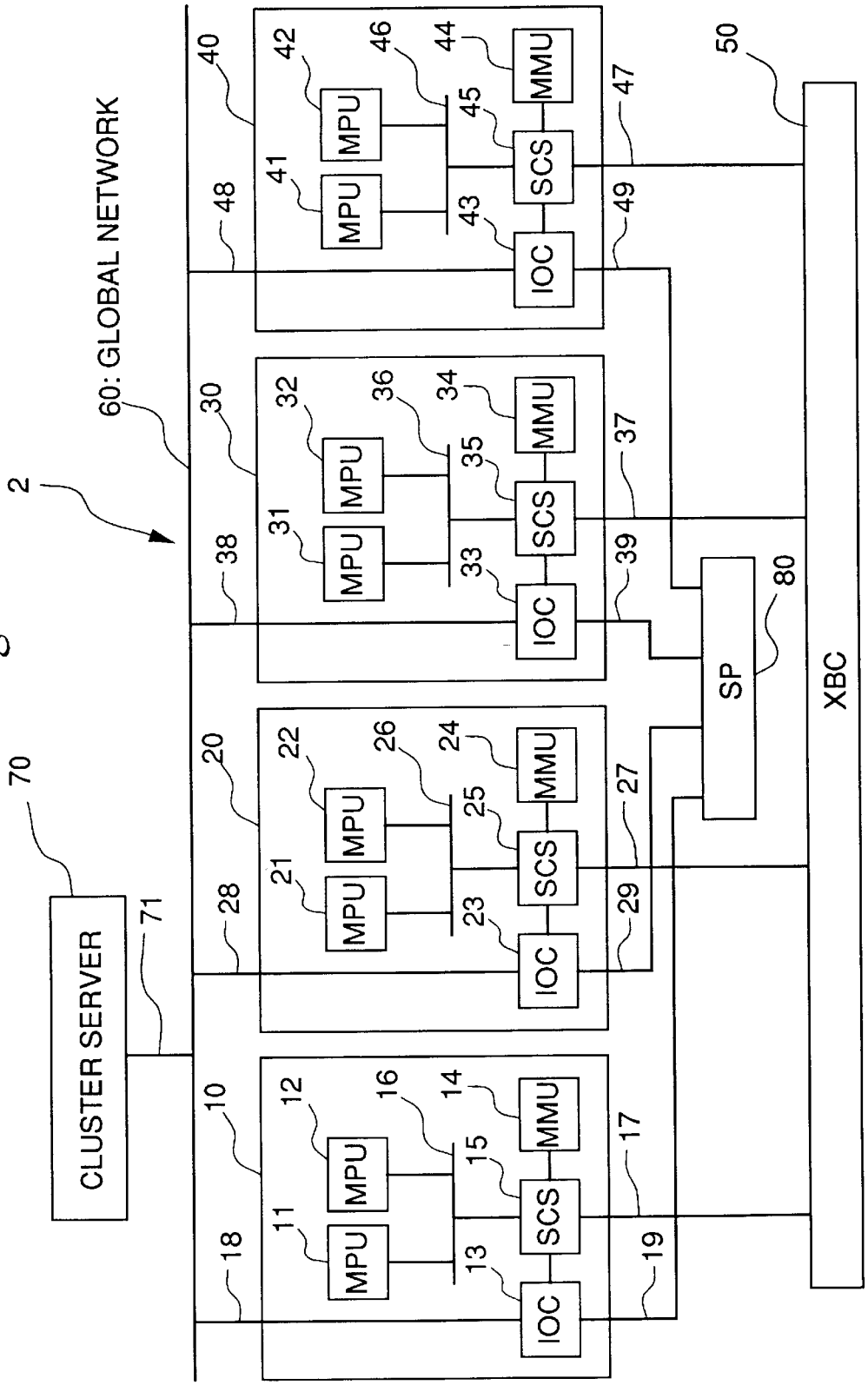
FIG. 15 is a block diagram showing a example of a different cluster computer applying the present invention.

The ninth embodiment differs from the first embodiment in that the present invention is applied to a cluster computer having a service processor (hereinbelow, abbreviated "SP), and notification of a common communication area error, etc., is carried out by the SP when a determination is made as to whether or not an irrecoverable memory error has occurred in the common communication area. An example of the entire configuration of the cluster computer of the present embodiment is shown in FIG. 15. The difference between this configuration and the configuration of FIG. 1 is that each of the nodes 10, 20, 30 and 40 comprises input-output controllers IOCs 13, 23, 33, 43, and that respective nodes are connected to the SP (Service Processor) 80 through the signal lines 19, 29, 39, and 49.

In the cluster computer 2 of this example, when a recoverable error or an irrecoverable error occurs in the MMUs in any node, that MMU sends an error report to the SP 80 through the SCS of the same node. This error report includes such information as the error memory address, whether the error is recoverable or irrecoverable, and the node of the access request origin.

Figure 16:
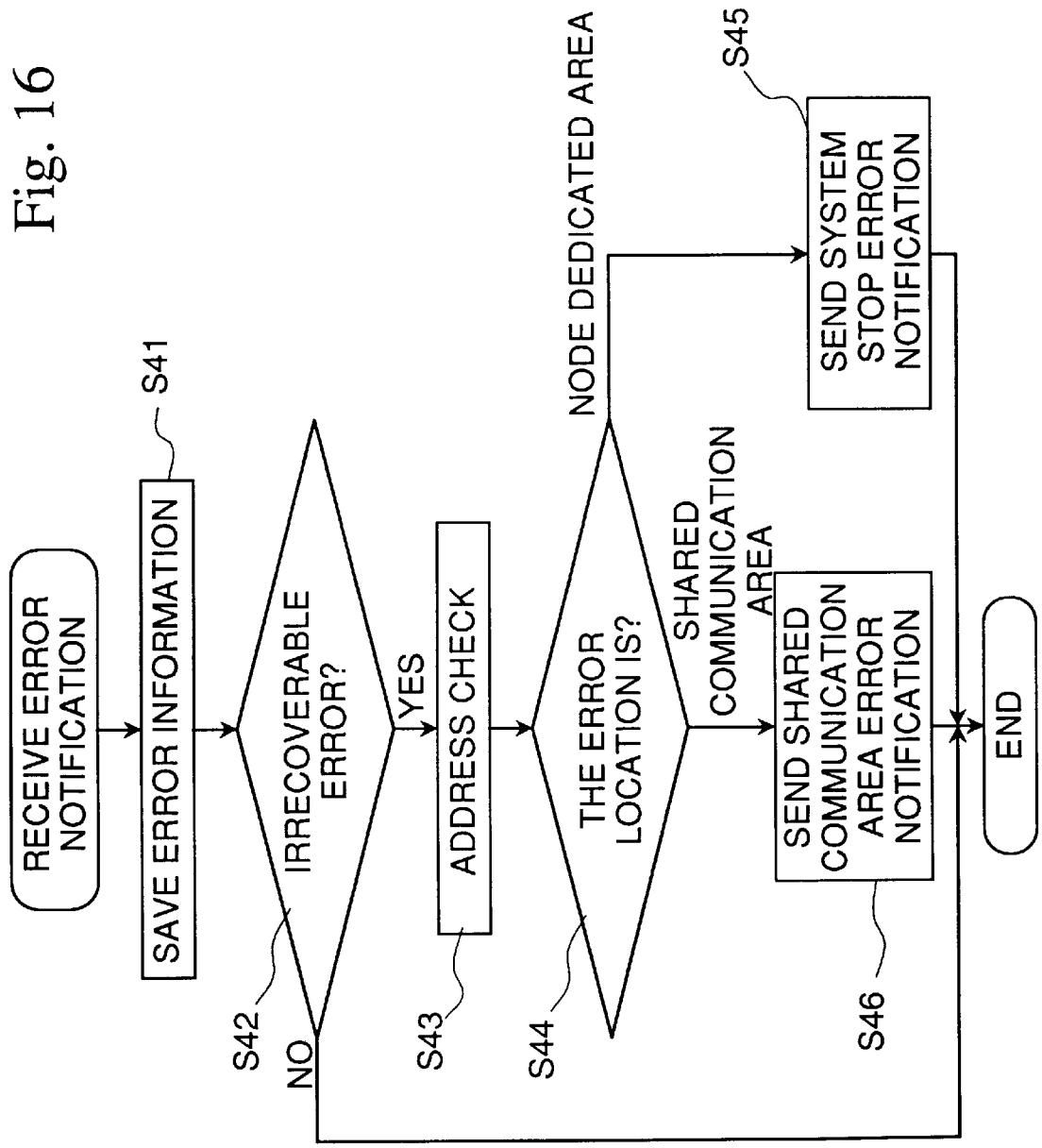
FIG. 16 is a flow chart showing an example of the processing of the service processor.

The SP 80 executes processing shown in FIG. 16 when this error report is received.

First, the SP 80 saves the contents of the error report as an error log (step S 41). Next, it distinguishes whether or not the report is for an irrecoverable memory error (step S 42), and in the case that it is a recoverable memory error, ends the processing shown in FIG. 16. Otherwise, in the case that it is an irrecoverable memory error, it checks in the following manner whether this error occurred in the common communication area or occurred in a node privileged area (step S 43).

The SP 80 itself also holds the memory maintenance tables 15a, 25a, 35a, and 45a, shown in FIG. 3, that each node maintains. It searches the memory maintenance table corresponding to the node that sent the error report by the error memory address, checks the value 151 of the common/privileged flag of the entry that includes the error memory address from the opening address 152 within the address range of the memory length 153. If the value its 0, it determines that an irrecoverable memory error has occurred in the node privileged area of this node, and if the value is 1, it determines that an irrecoverable memory error has occurred in the common communication area (step S 44).

Next, the SP 80 sends a system stop error notification to the node of the access request origin when the irrecoverable memory error has occurred in the node privileged area (step S 45). Otherwise, it sends a common communication area error notification to the node of the access request origin when an irrecoverable error has occurred in the common communication area (step S 46).

Figure 17:
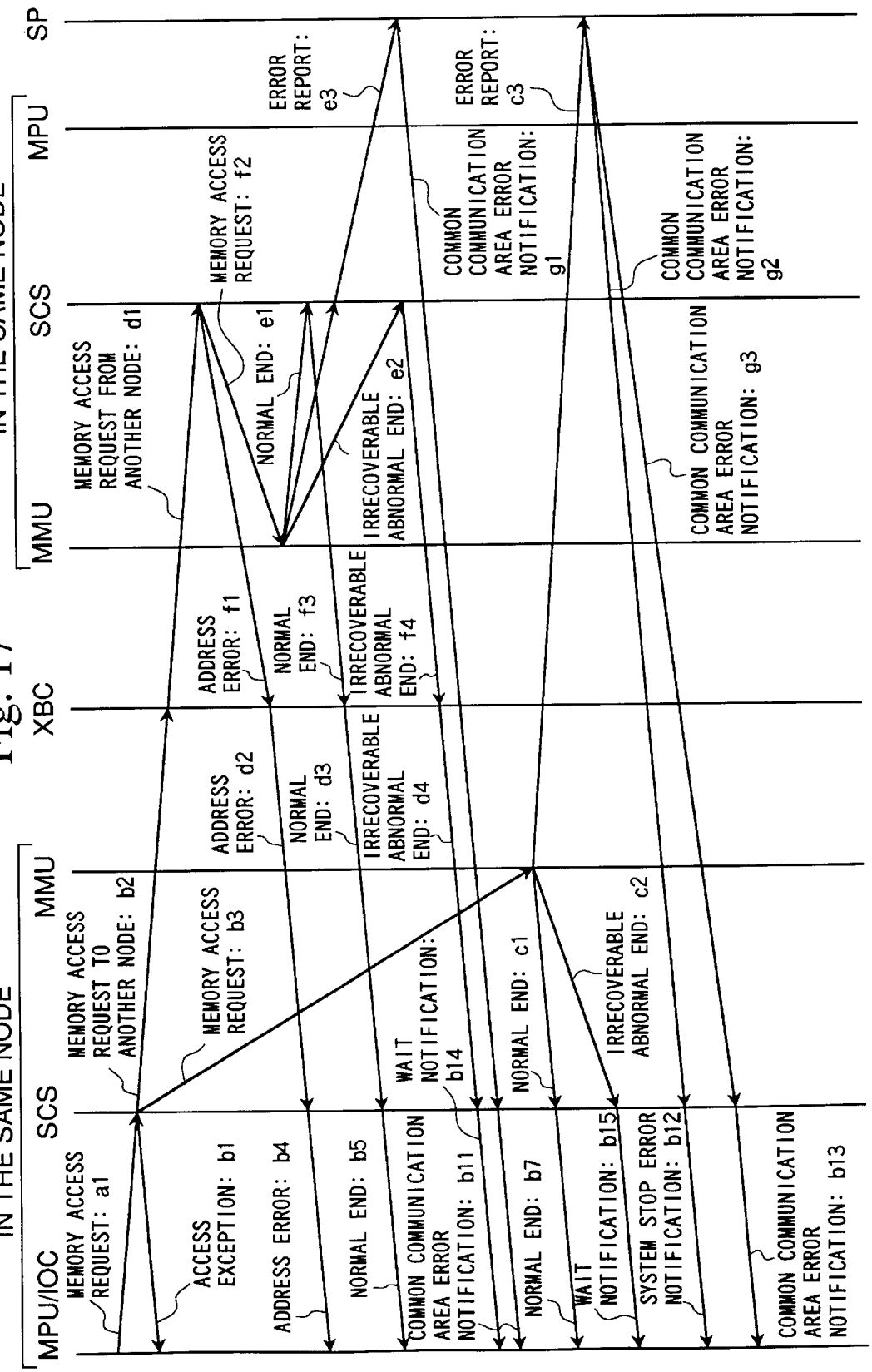
FIG. 17 is a drawing showing the processing flow of a memory access according to the ninth embodiment of the present invention.

FIG. 17 shows the flow of signals related to the memory access when a memory access request is sent from an MPU or an IOC in a given node in the present embodiment. Below, referring to FIG. 17, the operation of the present embodiment will focus on the points of difference between this and the operation of the first embodiment shown in FIG. 7.

In a node that has received a memory access request d1 from another node, in the case that a recoverable error or an irrecoverable error has occurred when the memory access request f2 is sent to an MMU of the same node, the error report e3 is sent to the SP 80 from this MMU through the SCS. In addition, when the error is irrecoverable, an irrecoverable abnormal stop e2 is sent to the SCS, as in the first embodiment, and the SCS sends this to the SCS of the node the access request origin through the XBC 50 (f4, d4).

The SP 80 that received the error report e3 makes a log of the error information, and in the case of an irrecoverable error carries out processing depending on the location of the error occurrence by the processing shown in FIG. 16. Because the memory access request d1 from another node is an access to the common communication area, here, it determines that an irrecoverable error has occurred in a common communication area, and a common communication area error notification is sent to the SCS of the node of the access request origin (g1). The SCS of the node of the access request origin sends the memory access origin the common communication area error notification b11 as the response to the memory access, and the memory access origin starts the operation in the same manner as explained in the first embodiment.

Otherwise, in the case that a recoverable error or an irrecoverable error has occurred in an MMU in the processing of a memory access request b3 for the node privileged area that was generated in the same node, an error report c3 is sent to the SP 80 through the SCS (not shown in FIG. 17) from this MMU. In addition, when the error is irrecoverable, the irrecoverable abnormal stop c2 is sent to the SCS in the same manner as in the first embodiment.

By the processing shown in FIG. 16, the SP 80 that received the error report c3 makes a log of the error information and in the case that there is an irrecoverable error, carries out processing depending on the location of this error occurrence. Because the memory access within the same node has both an access to the node privileged area and access to the common communication area, in the case that an irrecoverable error has occurred in the node privileged area of the relevant node, the SP 80 sends a system stop error notification g2 to the SCS of that node. By receiving this system stop error notification g2, the SCS of that node sends the memory access origin the system stop error notification b12 as the response to the memory access, and the memory access origin starts the operation in the same manner as explained in the first embodiment. Otherwise, in the case that an irrecoverable error has occurred in the common communication area, the SP 80 sends a common communication area error notification g3 to the SCS of the relevant node. By receiving this common communication area error notification g3, the SCS of this node sends the memory access origin the common communication area error notification b 13 as the response to the memory access.

In this embodiment, when an irrecoverable error occurs during memory access, because the memory access origin is sent the common communication area error notification and the system stop error notification generated by the SP 80, compared to the first embodiment, time is required from the memory access origin sending the memory access request until receiving these above notifications. Because of this, depending on the case, there is the possibility that a time-out will be generated. Thus, in the present embodiment, when the SCS of the node that transfers the memory access request to another node receives an irrecoverable abnormal stop d4 from the companion node, a wait notification b14 is sent to the memory access origin. In addition, when a memory access request from the same node is sent to an MMU of the same node and when an irrecoverable abnormal stop c2 is received from the MMU, a wait notification b15 is sent to the memory access origin. These wait notifications b14 and b15 are dummy notifications for avoiding time-outs, and when the memory access origin receives a wait notification, the time-out monitoring is suspended, and it waits for a system stop error notification or a common communication area error notification to be delivered.

Figure 18:
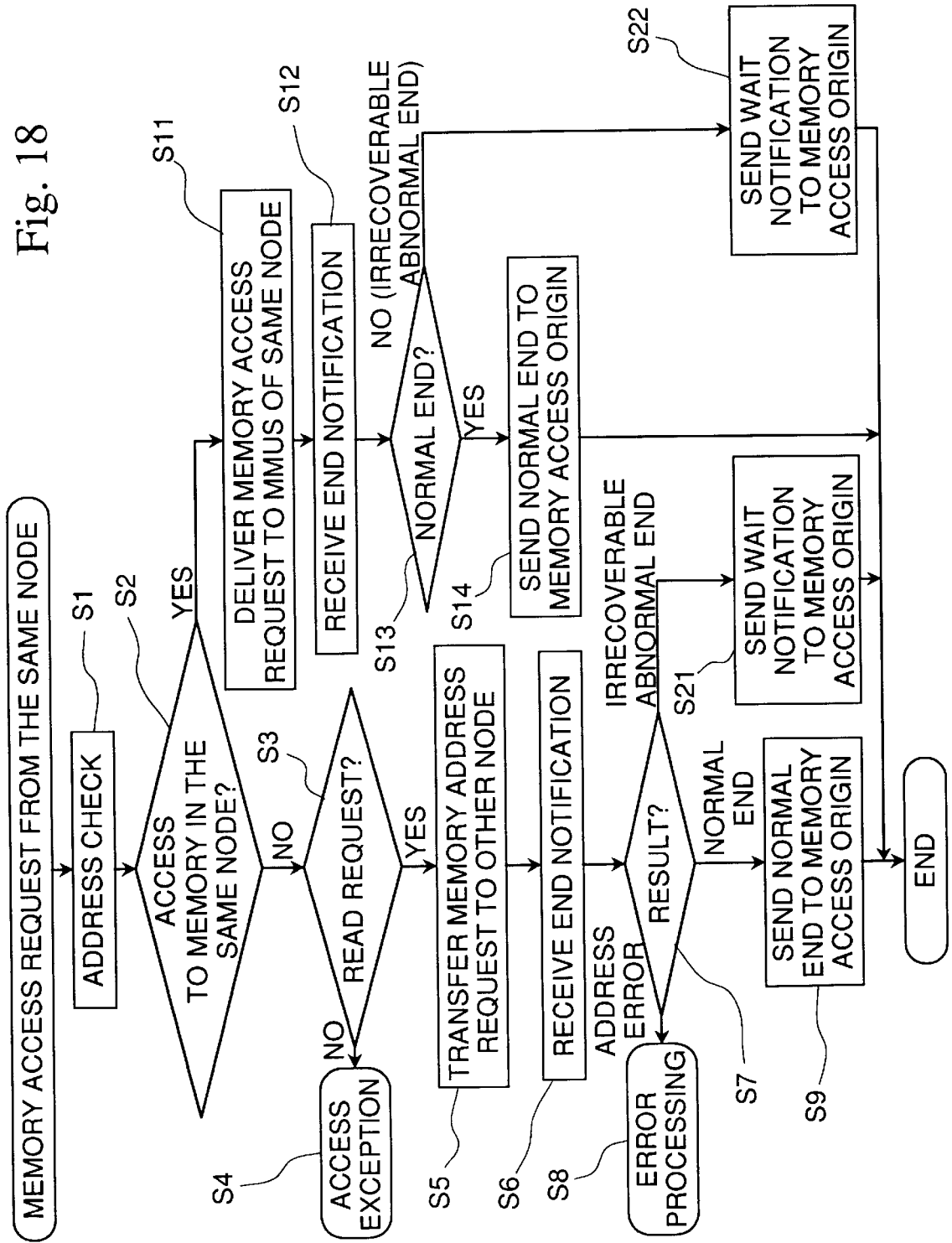
FIG. 18 is a flow chart showing another example of the processing of a SCS when a memory access request has been received from an MPU of one node or an IOC.

In this embodiment, because the SP 80 carries out the determination as to whether or not the irrecoverable memory error occurred in either the common communication area or the memory privileged area, and sends notifications such as the common communication area error notification, it is not necessary for the SCS of each node to execute processing related to the address check (S 15) in FIG. 5, and the processing of the SCS of each node is simplified, as is shown in FIG. 18.

Tenth Embodiment

Figure 19:
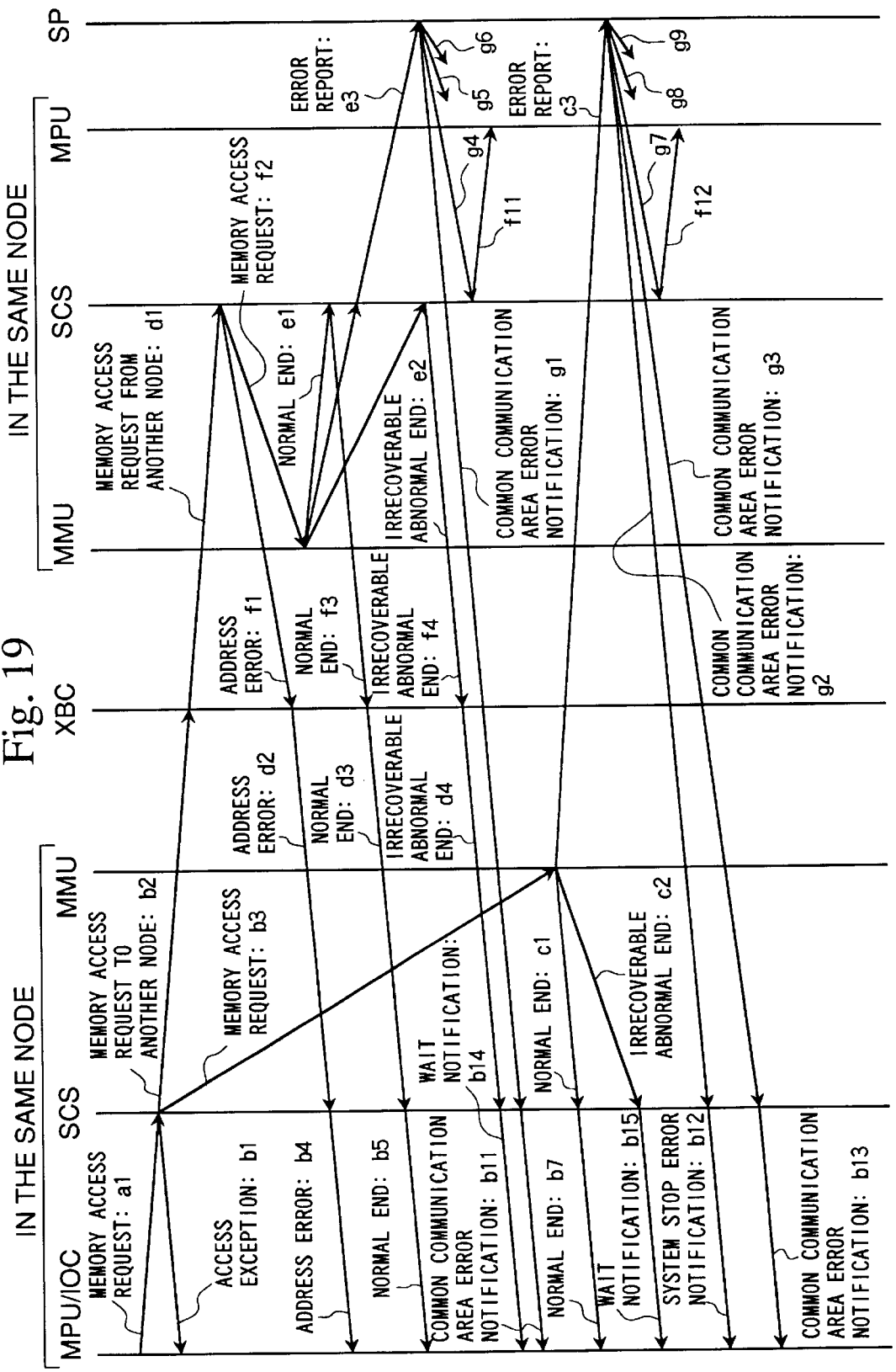
FIG. 19 is a drawing showing the processing flow of a memory access according to the tenth embodiment of the present invention.

The tenth embodiment of the present invention differs from the ninth embodiment in that when the SP 80 determines that an irrecoverable error has occurred in the common communication area, as shown in g1, g4~g6, g2, and g7~g9 in FIG. 19, a common communication area error notification is sent not just to the access request origin but to all other nodes. Otherwise, this embodiment is identical to the ninth embodiment. The SCS of each node that received the common communication area error notification sends it to the MPUs in the same node (f11, f12). Thereby, it is possible for the buffer degeneracy processing in each node to start quickly.

The explanations of the above embodiments of the present invention do not limit the present invention only to the above embodiments, and it is possible to make various other additions and alterations. For example, the following configuration is possible.

A configuration wherein the common communication area does not carry out degeneracy by buffer unit. In this case, when an irrecoverable error occurs in the common communication area, in the above-described embodiments, processing is immediately carried out in the case that there is not one available buffer.

A configuration wherein only communication between nodes through the XBC according to the common memory model is supported, and communication between nodes through the global network according to the message exchange model is not supported. In this case, the node wherein the common communication area located on the same node is not usable due to an irrecoverable error is down in terms of the cluster configuration. However, a job that executes after the same node has closed can continue to execute.

A configuration without a proper cluster server 70. In this case, in the configuration all nodes together have the function of the cluster server 70.

According to the present invention as explained above, during a memory access, as notifications sent when an irrecoverable error has occurred, two types are defined: the system error stop notification and the common communication error notification. If the location in which the irrecoverable error has occurred in a node privileged area, the system error stop notification is sent, and if it is the common communication area, a common communication area error notification indicating a more minor error is sent rather than the system error stop notification, and thereby it is possible to prevent the node that accessed this common area from shutting down the system due to an irrecoverable error that has occurred in the common communication area of the memory located on another node. In addition, it is possible to prevent the same node from shutting down the system due to an irrecoverable error occurring in the common communication area of the memory located on the same node, and it is possible it increase the availability of the cluster computer.

What is claimed is:

1. A memory error processing method in a cluster computer comprising:

a plurality of nodes that each includes a memory having an error correction function and at least one processor connected together by an interconnection network, and each node comprising a proper area and a common communication area, which are set on a memory of each node, and the common communication area of each node is logically common to the common communication areas of said plurality of nodes, the memory error processing method comprising:

each node sending the memory access origin a system error stop notification, in the case of accessing a proper memory of the same node when an irrecoverable error has occurred in said memory of the same node; and each node sending the memory access origin a common communication area error notification through the intercommunication network to the common communication area of the memory installed in another node, when an irrecoverable error has occurred in said memory area of another node.

2. A memory error processing method in the cluster computer according to claim 1, wherein a system control apparatus in each node, which carries out control of transferring to another node through the interconnection network when a memory access request generated in an own node is an access request for the memory of the other node, sends the memory access origin a common communication area error notification, if a irrecoverable abnormal end is received from another node through the interconnection networks as an response to a memory access request.

3. A memory error processing method in the cluster computer according to claim 2, wherein the system control apparatus in own node sends the node of the access request origin an irrecoverable abnormal end through the interconnection network in the case that an irrecoverable abnormal end occurs in memory of the same node while requesting a memory access from another node.

4. A memory error processing method in the cluster computer according to claim 2, wherein the interconnection network that is requested to transfer an irrecoverable abnormal stop as a response to a memory access request broadcasts this irrecoverable abnormal end to all nodes.

5. A memory error processing method in the cluster computer according to claim 1, wherein the interconnection network that is requested to transfer an irrecoverable abnormal stop as a response to a memory access request instead sends a common communication area error notification to the node of the transfer destination.

6. A memory error processing method in the cluster computer according to claim 5, wherein an interconnection network broadcasts a common communication area error notification to all nodes.

7. A memory error processing method in the cluster computer according to claim 1, wherein a service processor which receives an error message from each of the nodes and takes an error log, determines whether or not this error has occurred in the common communication area, and sends the node of the access origin a common communication area error notification when the error occurs in the common communication area.

8. A memory error processing method in the cluster computer according to claim 7, wherein said service processor sends all nodes, including the node of the access origin, a common communication area error notification.

9. A memory error processing method in the cluster computer according to claim 1, wherein the method further comprises, during common communication area error notification, carrying out processing for degenerating the common communication area in which an error has occurred in a unit of buffer.

10. The method of claim 1, wherein said irrecoverable error in the same node occurred while sending a memory access request generated in that node to the proper memory area of that node.

11. The method of claim 1, wherein said irrecoverable error in the same node occurred while sending a memory access request generated in that node to the common communication area of the memory area of that node.

12. A memory error processing method in the cluster computer which comprises:
 a plurality of nodes that includes a memory having an error correction function and at least one processor connected together by an interconnection network, and
 a common communication area set on the memory of each node and which is logically common between a proper area of an own node and said plurality of nodes,
 wherein the memory error processing method comprises:
  each node sending the memory access origin a system error stop notification, in the case of accessing the proper memory of the own node when an irrecoverable error has occurred while sending a memory access request generated in one node to the proper area of the own node; and
  each node sending the memory access origin a common communication area error notification, when an irrecoverable error has occurred while sending a memory access request generated in one node through the intercommunication network to the common communication area of the memory installed in another node;
  wherein a system control apparatus, that sends a memory access request to the memory of one node that is sent from another node through the intercommunication network and carries out control for returning this access result through the interconnection network to the node of the access origin, sends to the node of the access origin through the interconnection network a common communication area error notification instead when an irrecoverable abnormal stop is received from memory in the same node during a memory access request from another node.

13. A memory error processing method in the cluster computer according to claim 12, wherein the system control apparatus sends also the processor in the same node a common communication error notification.

14. A memory error processing method in the cluster computer according to claim 12, wherein the interconnection network broadcasts a common communication area error notification to all nodes.

15. A cluster computer having a plurality of nodes each including a memory having an error correction function and at least one processor, connected together through an interconnection network and each of the nodes comprising each memory having a proper area of its own node and a common communication area, and the common communication area is set to be common to the common communication areas of said plurality of nodes, comprising:
 a system control apparatus that sends the originator of a memory access request a system error stop notification when an irrecoverable error occurs in said memory of the nodes receiving the memory access request, and that sends the originator of the memory access request a common communication area error notification through the interconnection network to the common communication area of the memory installed in another node when an irrecoverable error has occurred in said memory of another node.

16. A cluster computer according to claim 15, wherein said system control apparatus for each node sends the originator of the memory access request a common communication area error notification when an irrecoverable error has occurred while sending a memory access request generated in the node receiving the memory access request to the common communication area in memory of the node receiving the memory access request.

17. A memory error processing method in a cluster computer including a plurality of nodes that each includes a memory having an error correction function and at least one processor connected together by an interconnection network, and a common communication area set on the memory of each node and which is logically common between a proper area of an own node and said plurality of nodes, the memory error processing method comprising:
 each node sending the memory access origin a system error stop notification, when an irrecoverable error has occurred in said memory of the same node; and
 each node sending the memory access origin a common communication area error notification, when an irrecoverable error has occurred in said memory of another node;
 wherein a system control apparatus sends a memory access request to the memory of one node that is sent from another node through the intercommunication network and carries out control for returning this access result through the interconnection network to the node of the access origin.

* * * * *

UNITED STATES PATENT AND TRADEMARK OFFICE
CERTIFICATE OF CORRECTION

PATENT NO. : 6,782,492 B1  
DATED : August 24, 2004  
INVENTOR(S) : Hiroko Nakaso It is certified that error appears in the above-identified patent and that said Letters Patent is hereby corrected as shown below:

<u>Title page,</u>
Item [30], Foreign Application Priority Data, should read:
-- [30]   Foreign Application Priority Data
   November 5, 1998 (JP) .................. 10-330175 --

Signed and Sealed this

Fourteenth Day of December, 2004

JON W. DUDAS  
*Director of the United States Patent and Trademark Office*